US012136995B2

(12) United States Patent
Pan et al.

(10) Patent No.: US 12,136,995 B2
(45) Date of Patent: Nov. 5, 2024

(54) SYNCHRONIZATION SIGNAL BURST, SIGNAL DESIGN, AND SYSTEM FRAME ACQUISITION IN NEW RADIO

(71) Applicant: InterDigital Patent Holdings, Inc., Wilmington, DE (US)

(72) Inventors: Kyle Jung-Lin Pan, Saint James, NY (US); Fengjun Xi, San Diego, CA (US); Robert L. Olesen, Huntington, NY (US); Nirav B. Shah, San Diego, CA (US)

(73) Assignee: InterDigital Patent Holdings, Inc., Wilimington, DE (US)

( * ) Notice: Subject to any disclaimer, the term of this patent is extended or adjusted under 35 U.S.C. 154(b) by 0 days.

(21) Appl. No.: 16/481,166

(22) PCT Filed: Feb. 2, 2018

(86) PCT No.: PCT/US2018/016551
§ 371 (c)(1),
(2) Date: Jul. 26, 2019

(87) PCT Pub. No.: WO2018/144790
PCT Pub. Date: Aug. 9, 2018

(65) Prior Publication Data
US 2019/0393972 A1    Dec. 26, 2019

Related U.S. Application Data

(60) Provisional application No. 62/556,171, filed on Sep. 8, 2017, provisional application No. 62/519,745, filed (Continued)

(51) Int. Cl.
*H04J 11/00* (2006.01)
*H04W 72/30* (2023.01)

(52) U.S. Cl.
CPC ....... *H04J 11/0073* (2013.01); *H04J 11/0076* (2013.01); *H04W 72/30* (2023.01)

(58) Field of Classification Search
CPC ............... H04J 11/0073; H04J 11/0076; H04J 11/0069; H04W 72/005
See application file for complete search history.

(56) References Cited

U.S. PATENT DOCUMENTS

| 8,050,225 B2 | 11/2011 | Luo |
| 8,493,964 B2 | 7/2013 | Han et al. |

(Continued)

FOREIGN PATENT DOCUMENTS

| CN | 101689930 A | 3/2010 |
| CN | 102075946 A | 5/2011 |

(Continued)

OTHER PUBLICATIONS

Third Generation Partnership Project (3GPP), "On Requirements and Design of SS Burst Set", Nokia, 3GPP TSG-RAN WG1 NR AH meeting, Spokane, U.S.A., Jan. 16-20, 2017, R1-1701058.

(Continued)

*Primary Examiner* — Harry H Kim
*Assistant Examiner* — Mohammed M Murshid
(74) *Attorney, Agent, or Firm* — Flaster Greenberg, P.C.

(57) ABSTRACT

Systems, procedures, and instrumentalities are disclosed for synchronizing a signal burst, signal design, and/or system frame acquisition. A synchronization signal (SS) block or burst may be received. The SS block or burst may include a primary synchronization signal (PSS), a secondary synchronization signal (SSS), and/or a Physical Broadcast Channel (PBCH). A first cell ID may be determined and/or a plurality of SSS sequences may be generated. An m0 value (e.g., a first cyclic shift) may be determined from a set of m0 values, for example, based on the generated plurality of SSS (Continued)

sequences. An n1 value (e.g., a second cyclic shift) may be determined from a set of n1 values. A second cell ID may be determined, for example, based on the m0 value and the n1 value. A third cell ID may be determined, for example, based on the second cell ID and the first cell ID.

12 Claims, 23 Drawing Sheets

Related U.S. Application Data on Jun. 14, 2017, provisional application No. 62/500,752, filed on May 3, 2017, provisional application No. 62/454,524, filed on Feb. 3, 2017.

(56) References Cited

U.S. PATENT DOCUMENTS

| | | | |
|---|---|---|---|
| 9,609,585 B1* | 3/2017 | Markovic | H04W 48/20 |
| 10,887,143 B2* | 1/2021 | Guo | H04L 5/0023 |
| 2008/0273522 A1* | 11/2008 | Luo | H04L 27/2613 370/350 |
| 2009/0135804 A1* | 5/2009 | Swarts | H04W 56/0085 370/350 |
| 2011/0306341 A1* | 12/2011 | Klein | H04L 27/2655 455/434 |
| 2012/0046056 A1* | 2/2012 | Luo | H04J 11/0093 455/502 |
| 2013/0016801 A1* | 1/2013 | Xia | H04J 13/14 375/354 |
| 2013/0039268 A1 | 2/2013 | Blankenship et al. | |
| 2013/0321042 A1* | 12/2013 | Xu | H04W 56/00 327/141 |
| 2014/0050206 A1 | 2/2014 | Seo et al. | |
| 2014/0064244 A1* | 3/2014 | Kishiyama | H04W 72/23 370/329 |
| 2014/0301301 A1 | 10/2014 | Cheng et al. | |
| 2015/0016337 A1* | 1/2015 | Chung | H04L 5/0012 370/328 |
| 2017/0026965 A1 | 1/2017 | Ode | |
| 2017/0041096 A1* | 2/2017 | Xu | H04J 11/0073 |
| 2017/0195102 A1* | 7/2017 | Xiong | H04L 1/18 |
| 2017/0223668 A1* | 8/2017 | Chang | H04J 11/0069 |
| 2017/0288848 A1* | 10/2017 | Lei | H04L 7/0054 |
| 2018/0091341 A1* | 3/2018 | Sadiq | H04L 5/0053 |
| 2018/0123849 A1* | 5/2018 | Si | H04J 11/0073 |
| 2018/0198575 A1* | 7/2018 | Sheng | H04J 11/0069 |
| 2018/0213386 A1* | 7/2018 | Kim | H04L 5/0094 |
| 2018/0220426 A1* | 8/2018 | Rico Alvarino | H04W 72/0466 |
| 2018/0287845 A1* | 10/2018 | Kim | H04L 5/0048 |
| 2018/0316452 A1* | 11/2018 | Chen | H04W 76/20 |
| 2019/0268852 A1* | 8/2019 | Ryu | H04W 74/0833 |
| 2019/0306894 A1* | 10/2019 | You | H04W 74/0833 |
| 2019/0342896 A1 | 11/2019 | Kusashima et al. | |
| 2020/0015177 A1* | 1/2020 | Kim | H04L 27/261 |

FOREIGN PATENT DOCUMENTS

| | | |
|---|---|---|
| CN | 103607719 A | 2/2014 |
| JP | 2010529722 A | 8/2010 |
| JP | 2018110357 A | 7/2018 |
| WO | 2015/069026 A1 | 5/2015 |
| WO | WO 2015155898 A1 | 10/2015 |
| WO | 2018174587 A1 | 9/2018 |

OTHER PUBLICATIONS

Third Generation Partnership Project (3GPP), "Ss Bw and Multiplexing", Samsung, 3GPP TSG RAN WG1 NR AH Spokane, USA, 5.1.1.1.1, Discussion, R1-1700883, Jan. 16-20, 2017, 8 pages.

Third Generation Partnership Project (3GPP), "Discussion on Synchronization Procedure in NR", Sequans Communications, 3GPP TSG-RAN WG1 #88 Athens, Greece, R1-1701850, Feb. 13-17, 2017, 6 pages.

Third Generation Partnership Project (3GPP), "Basic Access Configuration Acquisition Principles for NR", Ericsson, 3GPP TSG-RAN WG2 #96 Reno, Nevada, USA, R2-168298, Nov. 14-18, 2016, 2 pages.

3rd Generation Partnership Project, "Remaining details on SS sequence design", Nokia, et al., 3GPP TSG RAN WG1 #89, R1-1708231, May 5, 2017, 7 pages.

3rd Generation Partnership Project, "NR synchronization signal design", Ericsson; 3GPP TSG-RAN WG1 Meeting #89, R1-1708719, May 7, 2017, 6 pages.

ZTE, ZTE Microelectronics: "Paging in NR [online]", 3GPP TSG RAN WG1 AH_NR Meeting R1-1700102, JPN6022007447, Jan. 10, 2017 (Jan. 10, 2017), ISSN: 0004716253.

R1-1705054, "Synchronization Signals for NR", Huawei, HiSilicon, 3GPP TSG RAN WG1 Meeting #88bis Spokane, USA, Apr. 3-7, 2017, 16 Pages.

R1-1708367, "SS block and SS burst set composition", Sharp, 3GPP TSG RAN WG1 #89 Meeting Hangzhou, P. R. China,, May 15-19, 2017, 5 Pages.

Hattachi et al., "NGMN 5G White Paper", NGMN Alliance, NGMN 5G Initiative, Version 1.0, Feb. 17, 2015, pp. 1-125.

ITU-R, "IMT Vision—Framework and Overall Objectives of the Future Development of IMT for 2020 and Beyond", Recommendation ITU-R M.2083-0, M Series, Mobile, Radiodetermination, Amateur and Related Satellite Services, Sep. 2015, 21 pages.

Tomatis et al., "Synchronization and Cell Search", LTE—The UMTS Long Term Evolution: From Theory to Practice, John Wiley & Sons, Ltd., Feb. 2009, 17 pages.

3rd Generation Partnership Project (3GPP), TR 38.913 V0.3.0, "Technical Specification Group Radio Access Network, Study on Scenarios and Requirements for Next Generation Access Technologies (Release 14)", Mar. 2016, 30 pages.

* cited by examiner

| Q1 | Q2 | Q3 | Q4 |
|----|----|----|----|

FIG. 20

| 0 | 0 | 1 | 1 | 1 | 0 | 0 | 1 |
|---|---|---|---|---|---|---|---|

FIG. 21

SYNCHRONIZATION SIGNAL BURST, SIGNAL DESIGN, AND SYSTEM FRAME ACQUISITION IN NEW RADIO

CROSS-REFERENCE

This application is the National Stage entry under 35 U.S.C. § 371 of Patent Cooperation Treaty Application PCT/US2018/016551, filed Feb. 2, 2018, which claims the benefit of U.S. Provisional Application No. 62/454,524, filed on Feb. 3, 2017; U.S. Provisional Application No. 62/500,752, filed on May 3, 2017; U.S. Provisional Application No. 62/519,745, filed on Jun. 14, 2017; and U.S. Provisional Application No. 62/556,171, filed on Sep. 8, 2017, which are incorporated herein by reference as if fully set forth.

BACKGROUND

A broad classification of use cases for emerging 5G systems can be depicted as follows: Enhanced Mobile Broadband (eMBB), Massive Machine Type Communications (mMTC), and Ultra Reliable and Low Latency Communications (URLLC). The broad classification of the use cases may be based on requirements set out by ITU-R, NGMN, and 3GPP. Use cases may focus on one or more requirements, such as higher data rate, higher spectrum efficiency, low power, higher energy efficiency, lower latency, and higher reliability. A wide range of spectrum bands ranging from 700 MHz to 80 GHz may be considered for a variety of deployment scenarios.

SUMMARY

Systems, procedures, and instrumentalities are disclosed for synchronizing a signal burst, signal design, and/or system frame acquisition in a new radio (NR). A synchronization signal (SS) block may be defined based on an SS burst, wherein one or more of SS bursts may define an SS burst set. The SS block to be activated, enabled, or transmitted may be determined. Information of the SS block to be activated, enabled, or transmitted may be provided to another entity. Based on the SS block to be activated, enabled, or transmitted, an OFDM symbol index, a slot index in a radio frame, a radio frame number, and/or a mini-slot index may be identified. A quasi-co-located (QCL) indication and/or a Rate matching indication may be provided (e.g., may be provided for SS Blocks).

A synchronization signal (SS) burst may be received. The SS burst may include a primary synchronization signal (PSS), a secondary synchronization signal (SSS), and/or a Physical Broadcast Channel (PBCH). A first cell ID carried by (e.g., in) the PSS may be determined. A plurality of SSS sequences may be generated, for example, based on a first M sequence and a second M sequence. An m0 value (e.g., a first cyclic shift) may be determined from a set of m0 values (e.g., a first set of cyclic shifts), for example, based on the generated plurality of SSS sequences. An n1 value (e.g., a second cyclic shift) may be determined from a set of n1 values (e.g., a second set of cyclic shifts). A second cell ID carried by (e.g., in) the SSS may be determined, for example, based on the m0 value and the n1 value. A third cell ID may be determined, for example, based on the second cell ID carried by the SSS and the first cell ID carried by the PSS.

A portion of a system frame number (SFN) may be determined based on a scrambling code. The scrambling code may be based on the third cell ID. A portion (e.g., another portion) of the SFN may be acquired in an SS burst. The SFN (e.g., the entire SFN) may be determined, for example, based on the determined portion of the SFN and the portion of the SFN acquired in the SS burst being the same.

BRIEF DESCRIPTION OF THE DRAWINGS

A more detailed understanding may be had from the following description, given by way of example in conjunction with the accompanying drawings wherein:

FIG. 20 shows an example quasi-co-located (QCL) indication for synchronization signal (SS) Blocks.

FIG. 21 shows another example QCL indication for SS Blocks.

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to be exemplary and in no way limit the scope of the application.

Figure 1A:
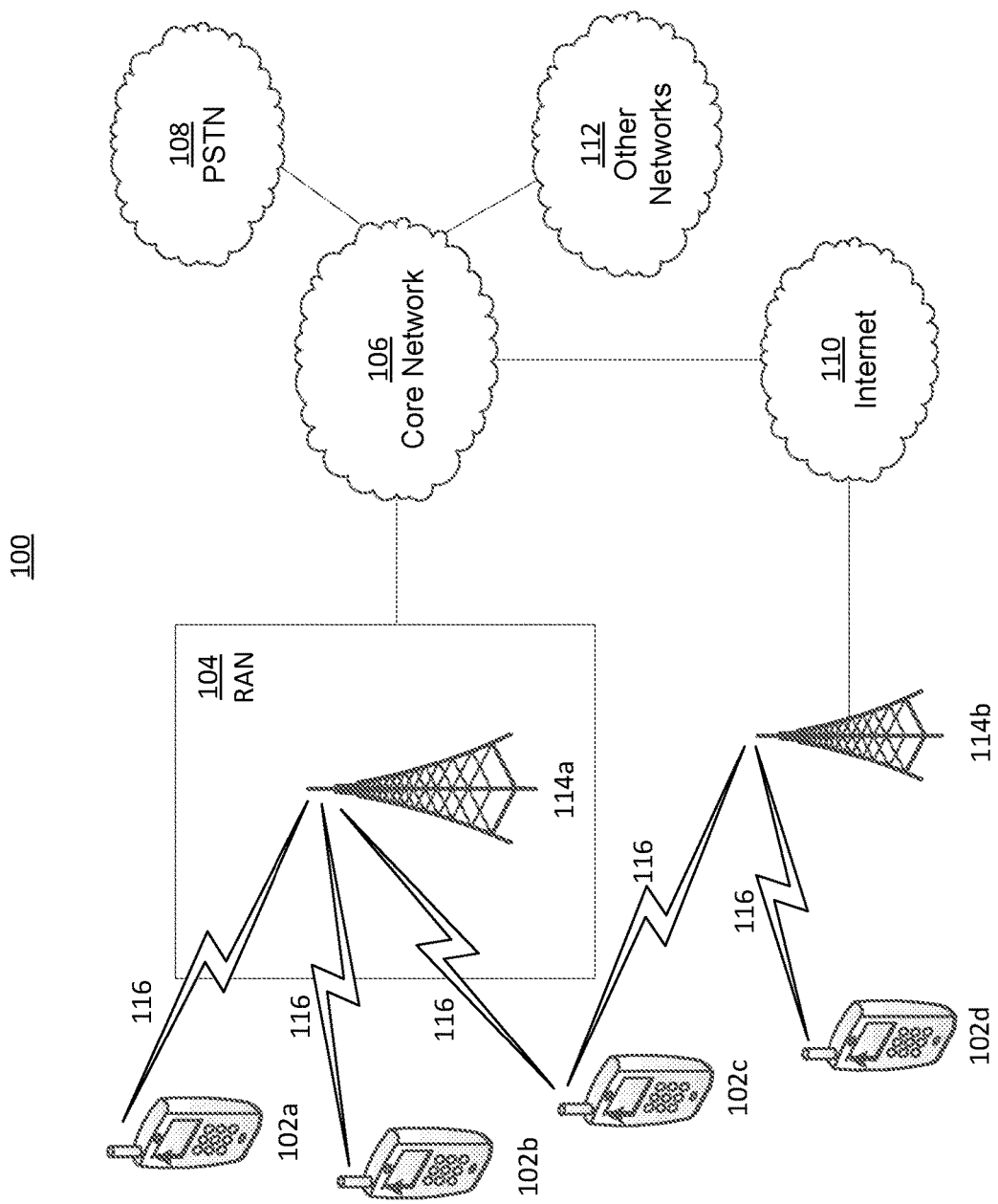
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
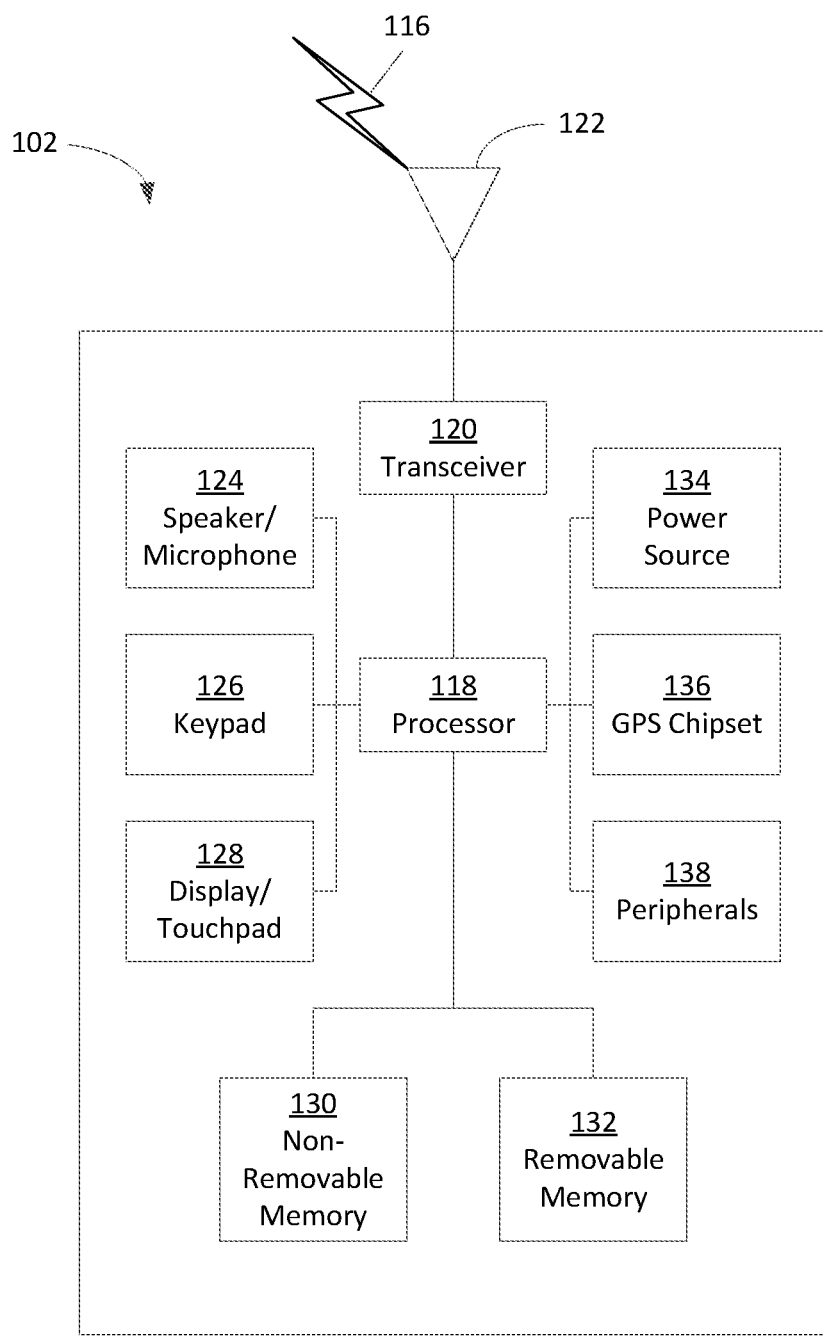
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
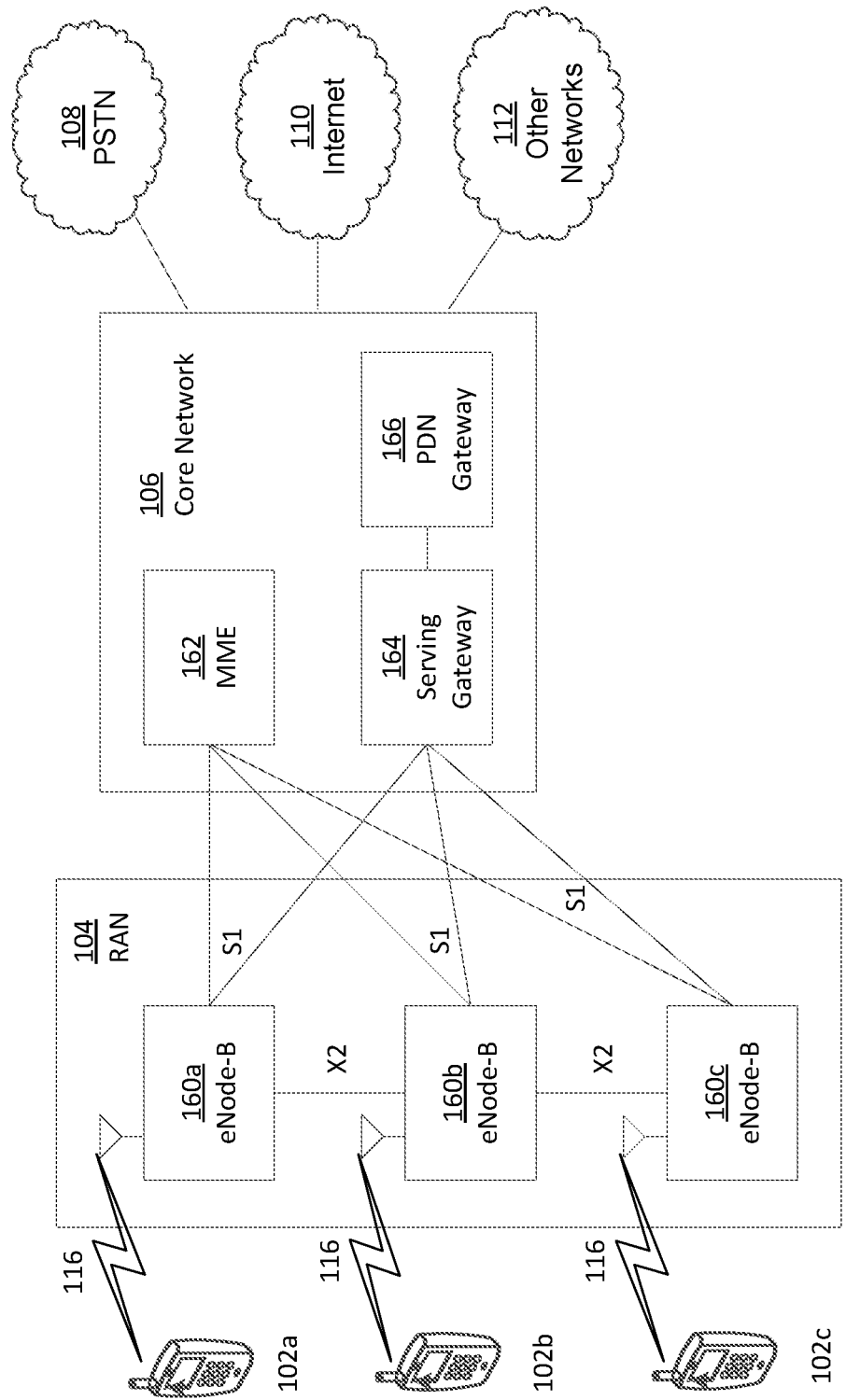
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be performed on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
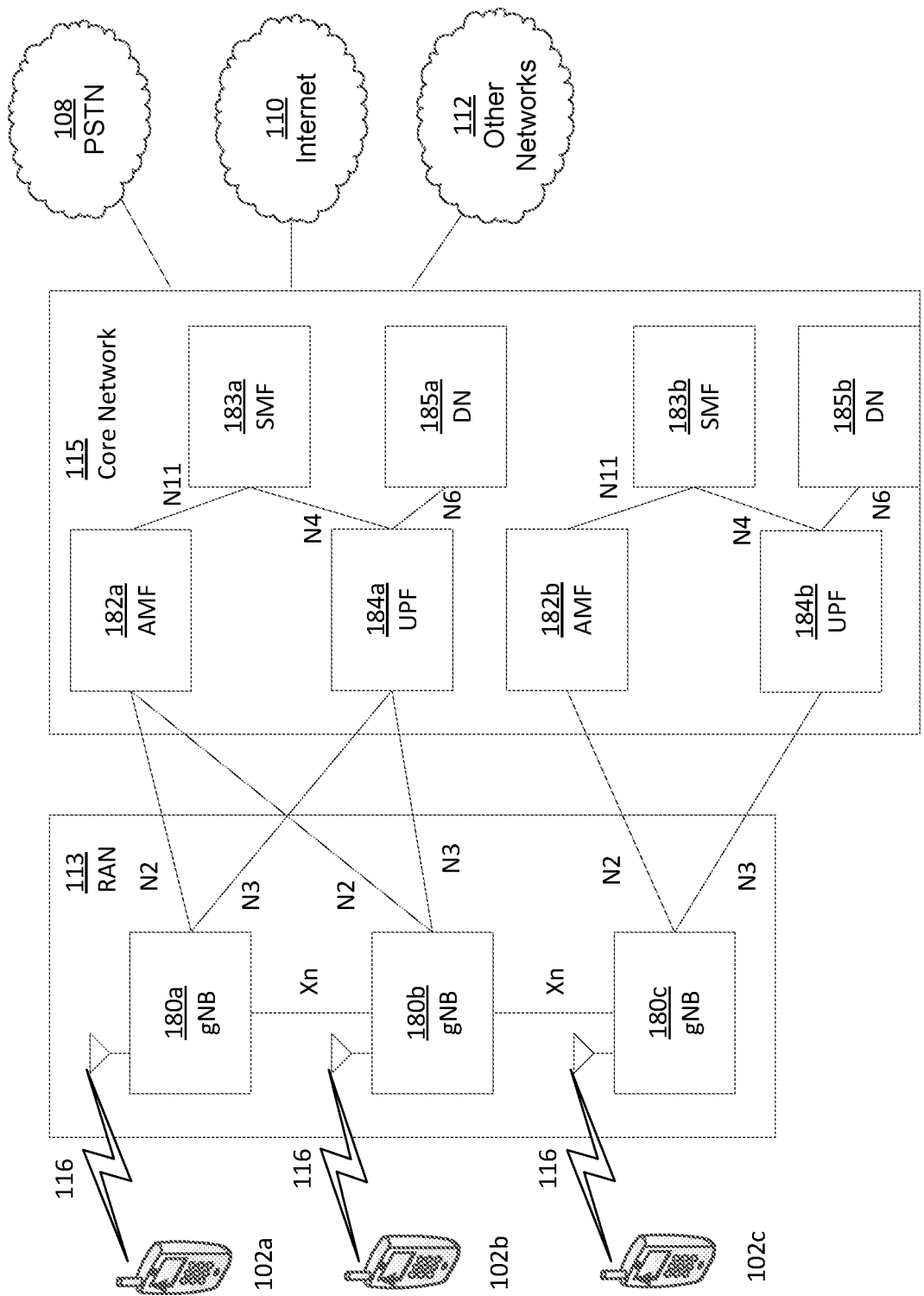
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A broad classification of use cases for emerging 5G systems can be depicted as follows: Enhanced Mobile Broadband (eMBB), Massive Machine Type Communications (mMTC), and Ultra Reliable and Low Latency Communications (URLLC). The broad classification of the use cases may be based on requirements set out by ITU-R, NGMN, and 3GPP. Use cases may focus on one or more requirements, such as higher data rate, higher spectrum efficiency, low power, higher energy efficiency, lower latency, and higher reliability. A wide range of spectrum bands ranging from 700 MHz to 80 GHz may be considered for a variety of deployment scenarios.

As the carrier frequency increases, the path loss may become a limitation to guarantee sufficient coverage. Transmission in millimeter wave systems may suffer from non-line-of-sight losses (e.g., diffraction loss, penetration loss, Oxygen absorption loss, foliage loss, etc.). During initial access, the base station and/or WTRU may overcome the high path losses and/or discover one another. For example, utilizing antenna elements to generated beam formed signals may be used to compensate the path loss by providing beam forming gain. Beamforming techniques may include digital, analogue, and hybrid beamforming.

LTE Initial Synchronization and/or Broadcast Channel may be provided.

In a cell search, a WTRU may acquire time and/or frequency synchronization with a cell and/or may detect the Cell ID of the cell. LTE synchronization signals may be transmitted in the 0th and/or 5th subframes of one or more (e.g., every) radio frame and/or may be used for time and/or frequency synchronization during initialization. As part of the system acquisition, a WTRU may synchronize (e.g., synchronize sequentially) to the OFDM symbol, slot, subframe, half-frame, and/or radio frame, for example, based on the synchronization signals. Synchronization signals may be Primary Synchronization Signals (PSS) and/or Secondary Synchronization Signals (SSS). Primary Synchronization Signal (PSS) may be used to obtain slot, subframe, and/or half-frame boundary. PSS may provide physical layer cell identity (PCI) within the cell identity group. Secondary Synchronization Signal (SSS) may be used to obtain the radio frame boundary. SSS may enable the WTRU to determine the cell identity group, which may range from 0 to 167.

Following a synchronization (e.g., a successful synchronization) and/or PCI acquisition, the WTRU may decode the Physical Broadcast Channel (PBCH), for example, with the help of Cell Specific Reference Signal (CRS) and/or acquire the Master Information Block (MIB) information regarding system bandwidth, System Frame Number (SFN), and/or PHICH configuration.

The LTE synchronization signals and/or PBCH may be transmitted (e.g., transmitted continuously), for example, according to the standardized periodicity.

A high level unified synchronization signal (SS) burst structure may be as follows, e.g., in new radio (NR). PSS, SSS, and/or PBCH may be transmitted within an SS block, one or more SS block(s) may compose an SS burst, and/or one or more SS burst(s) may compose a SS burst set. Because one or more SS block(s) may compose an SS burst, and/or one or more SS burst(s) may compose an SS burst set, a PSS, SSS, and/or PBCH may be transmitted within an SS burst and/or an SS burst set. One or more of the following may be addressed and may be provided herein. Detailed designs for SS burst composition and/or construction may be provided. The information indicated in SS burst may be provided. Unified SS burst structure (e.g., to support single and/or multi-beam deployment) may be provided. Design for time indication (e.g., for SS burst that may cover single and/or multi-beam operations) may be provided. Detailed SS burst composition and/or construction may be provided.

The SS burst structure (e.g., the new SS burst structure) in NR may impact the system frame acquisition. LTE system frame acquisition may be conducted, for example, by scrambling and/or one or more system frame numbers (SFNs) carried in a PBCH payload to convey the SFN. A design to acquire system frame number and/or extended SFN (e.g., that is based on an SS burst set structure) may be provided (e.g., for NR), for example, to address the introduction of SS block and/or burst structure.

The SS burst set structure in NR may redesign SS sequence for system performance and/or synchronization latency (e.g., optimum system performance and synchronization latency). Sequence designs that meet the SS burst structure in NR may be provided.

An SS Burst Set may be designed and/or constructed.

An SS burst set design and/or construction may consider one or more of the following: radio frame number, slot number, subframe number, mini-slot number, system frame number, periodicity, and/or a coherent combining of a signal.

An SS-block may be defined with respect to a radio frame. An SS-block index may be indicated within a radio frame. An SS-block index may be a time index for a SS-block. The time index for the SS-block within a radio frame may be used, for example, to identify one or more SS blocks within the radio frame.

An SS block may be defined with respect to an SS burst. An SS burst may be defined with respect to an SS burst set. A time index may be used, for example, that may be specific to an SS-block within an SS-burst. Another time index may be used for an SS burst index that may be specific to one or more SS bursts within an SS-burst set. An SS burst index may be common across SS blocks in one or more SS bursts. An SS-block index may be indicated within an SS burst and/or an SS-burst index may be indicated within an SS-burst set. The SS-block may be defined with respect to an SS-burst set. An SS-block index may be indicated within an SS burst set. The time index for an SS-block within an SS burst set may be used to identify one or more SS blocks within the SS burst set. SS blocks may be localized within a predetermined window. SS blocks may be distributed across a periodicity (e.g., an entire periodicity) of an SS burst set. SS blocks may be localized. SS blocks (e.g., all SS blocks) may be confined within a half radio frame or within a 5 ms window. For example, SS blocks may be confined within the first or second half radio frame or within the first or second 5 ms window of a 10 ms radio frame. Whether SS blocks are confined within the first or second half radio frame or within the first or second 5 ms window of a 10 ms radio frame may be predetermined, for example, by default or indicated by an indicator. For example, a WTRU may be indicated where to receive the SS blocks (e.g., a first or second radio frame) based on a half radio frame indication.

For a frequency band, an SS block may correspond to K OFDM symbols (e.g., based on the default subcarrier spacing). K may be a constant. The multiplexing structure of signals within SS block may be fixed. An SS burst set may correspond to M SS bursts. An SS burst may correspond to N SS blocks. An SS burst set may correspond to L SS blocks. L may be L=MN. An example SS burst set design and/or construction may be depicted in FIG. 2.

Figure 2:
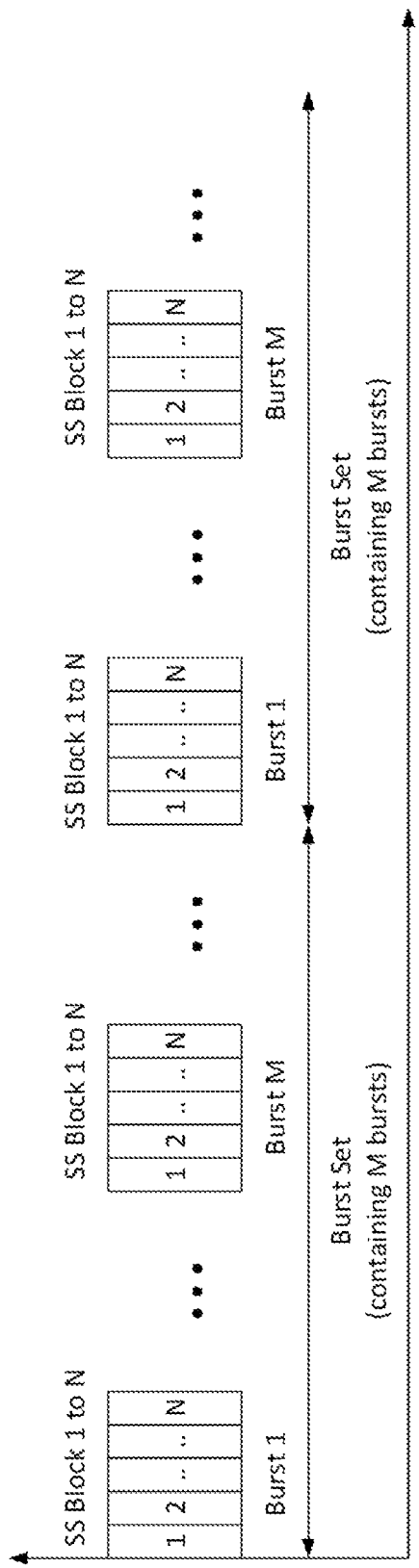
FIG. 2 shows an example Synchronization Signal (SS) Burst Set Composition and Construction.

FIG. 2 shows an example for constructing and/or designing an SS block, burst, and/or burst set. An SS burst may correspond to N SS blocks and/or an SS burst set may correspond to M SS bursts. SS block may be defined with respect to an SS burst and/or an SS burst may be defined with respect to an SS burst set. An SS-block index may be indicated within an SS burst and/or an SS-burst index may be indicated within an SS-burst set.

Figure 3:
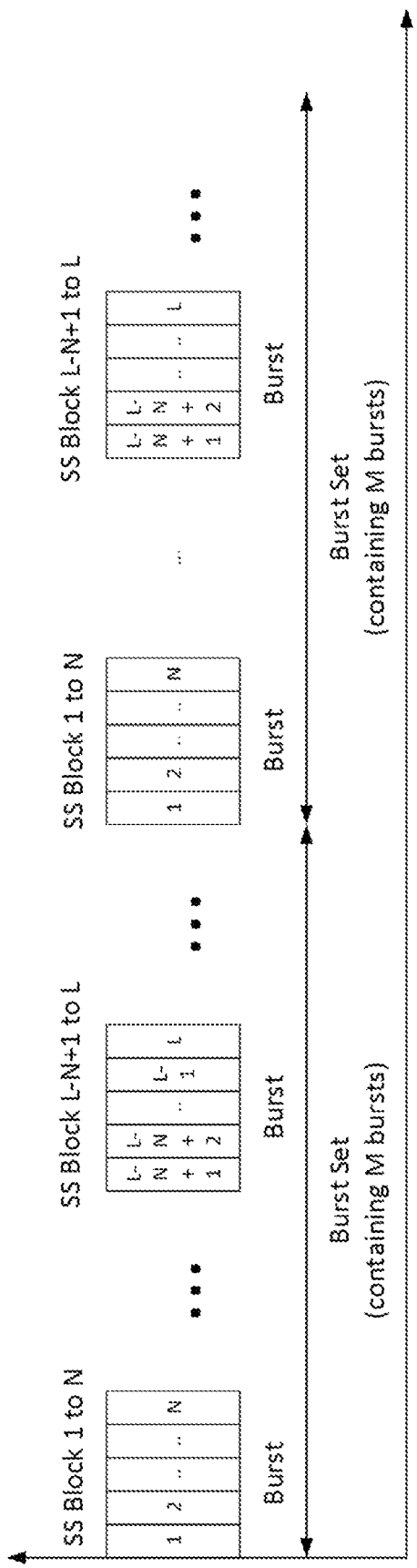
FIG. 3 shows another example SS Burst Set Composition and Construction.

FIG. 3 shows an example for constructing and/or designing an SS block, burst, and/or burst set. An SS burst set may correspond to L SS blocks. An SS block may be defined with respect to an SS burst set. An SS-block index may be indicated within an SS burst set.

Figure 4:
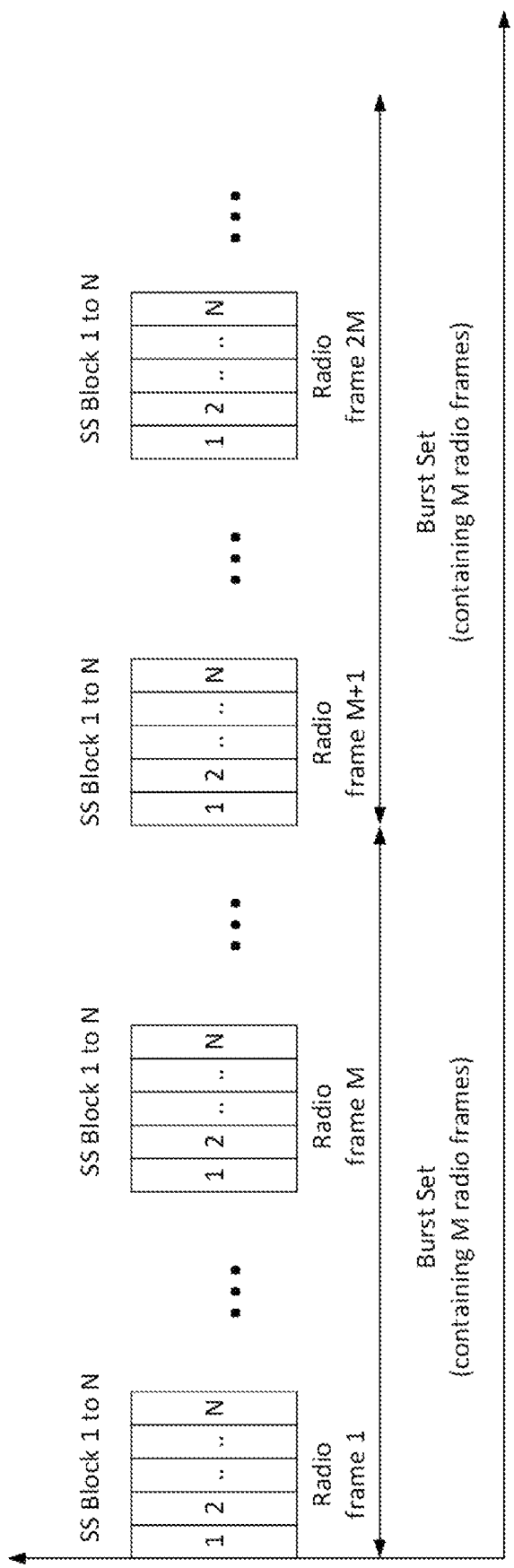
FIG. 4 shows another example SS Burst Set Composition and Construction.

FIG. 4 shows an example for constructing and/or designing an SS block, burst, and/or burst set. A radio frame may correspond to N SS blocks and/or an SS burst set may correspond to M radio frames. An SS block may be defined with respect to a radio frame. A radio frame may be defined with respect to an SS burst set. An SS-block index may be indicated within a radio frame and/or a radio frame index may be indicated within an SS-burst set.

As described herein, an SS burst may correspond to N SS blocks and/or an SS burst set may correspond to M SS bursts. An SS burst set may correspond to L SS blocks. A fixed value of one or more of M, N, or L (e.g., M and N, or L) may be used. The values of M, N, and/or L may be designed such that the values of M, N, and/or L are cell-specific, gNB-specific, and/or transmission and reception point (TRP)-specific. In examples (e.g., alternatives) the value of M, N, and/or L may not be fixed and/or may be changed. M and/or N may be updated and/or provided. Parameters M, N, and/or L may be configured.

A WTRU may be configured with information about which SS blocks (e.g., in a SS burst set) may be transmitted. A WTRU may provide information to a gNB and/or a TRP about which SS blocks (e.g., in a SS burst set) may be activated, enabled, and/or transmitted. An WTRU may be in an idle mode. When a WTRU is in an idle mode, the WTRU may provide information to a gNB and/or TRP about the (e.g., which) SS blocks in a SS burst set may be activated, enabled, and/or transmitted via initial UL transmission, NR-PRACH message 1, and/or message 3, etc. When in connected mode, a WTRU may provide information to a gNB and/or TRP about the (e.g., which) SS blocks in a SS burst set may be activated, enabled, deactivated, and/or disabled for transmission via WTRU feedback (e.g., UCI, such as NR-PUCCH) and/or via MAC CE and/or radio resource control (RRC) signaling, etc.

Based on a received SS block, a WTRU may identify one or more (e.g., all) of the following. The WTRU may identify an OFDM symbol index, a slot index in a radio frame, a radio frame number, and/or a mini-slot index. For initial cell selection, default SS burst set periodicity may be based on (e.g., a function of) a frequency band and/or a frequency range. A WTRU may assume a default SS burst set periodicity, for example, which may be determined based on a frequency band and/or a frequency range at which an WTRU may be operating. An SS block may be repeated with an SS burst set periodicity. NR-PBCH contents in a repeated SS block may not be the same and/or may change. A set (e.g., a single set) of SS block time locations may be specified per frequency range, frequency band, and/or sub-band.

The SS block may comprise one or more signals. For example, the SS block may contain one or more of NR-PSS, NR-SSS, and/or NR-PBCH. Signal types may be included within the SS block. For example, another type (e.g., a second type) of PBCH signal may be included (e.g., a secondary NR-PBCH signal may be included) within the SS block. Another type (e.g., a third type) of SS signal (e.g., a third SS and/or NR-SS signal), and/or NR-PSS and/or NR-SSS, may be included within the SS block. Other signal types (e.g., mobility reference signal (MRS) and/or measurement reference signals) may be included. One or more other channels (e.g., data transmission and/or control information) may be multiplexed in the SS block. One or more signals (e.g., NR-PBCH, a second NR-PBCH, a second type NR-PBCH, a third NR-PBCH, and/or third type SS signal) may be deactivated in one or more SS blocks.

An SS block index may be indicated using one or more of the following signals. The signals may include an NR-SS, NR-PBCH, another NR-SS, another type NR-SS (e.g., a third NR-SS), another NR-PBCH, another type NR-PBCH (e.g., a secondary NR-PBCH), etc. An SS block index may be carried in a payload of a PBCH signal and/or channel. For example, when an SS block index is indicated (e.g., indicated using NR-PBCH, another NR-PBCH, and/or another type of NR-PBCH), an SS block index may be carried in a payload of the PBCH signal and/or channel. An SS block index may be embedded in one or more of NR-PBCH, another NR-PBCH, and/or another type of NR-PBCH using some implicit features (e.g., CRC masking and/or sequence scrambling). A WTRU may not assume that the gNB and/or the TRP may transmit the same number of physical beam(s). A WTRU may not assume that the gNB and/or TRP may transmit the same physical beam(s) across one or more (e.g., different)SS-blocks within a SS burst and/or within a SS burst set.

A system frame may be acquired.

A system frame may be acquired, for example, using an SS Block and/or Burst.

An SS-block index may be used to indicate the radio frame number. When an SS-block index indicates one or more $N_{block}$ radio frames, the $N_{sf}$ system frames may be indicated as follows: SFN=f (SFN in PBCH, SS-block index). SS-block index may be represented by $\log_2(N_{block})$ bits for SFN LSB which may be indicated by SS block. SFN in PBCH may be represented by $\log_2(N_{sf})-\log_2(N_{block})$ bits for SFN MSB which may be indicated in NR-PBCH signal and channel (e.g., by NR-PBCH payload).

Figure 5:
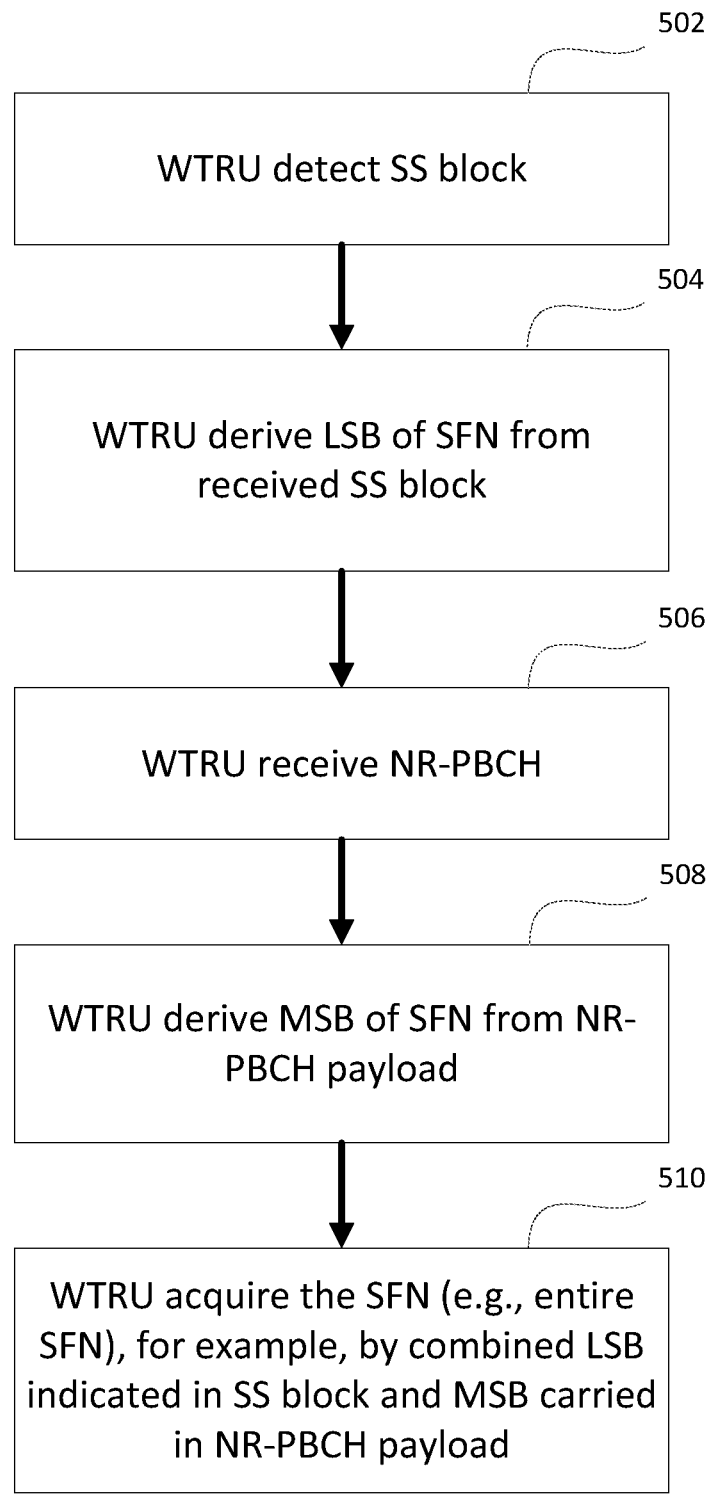
FIG. 5 shows an example system frame number acquisition.

FIG. 5 shows an example system frame number acquisition using an SS block index. At 502, a WTRU may detect an SS block and/or the associated SS block index. A WTRU may derive an LSB of SFN from the received SS block and/or the associated SS block index, at 504. A WTRU may receive an NR-PBCH, at 506. A WTRU may derive an MSB of an SFN from the received NR-PBCH signal and/or channel, at 508. A WTRU may acquire the SFN (e.g., entire SFN), at 510. For example, a WTRU may acquire the SFN (e.g., entire SFN) by combining the LSB that may be indicated and/or carried in an SS block and/or an MSB that may be indicated and/or carried in an NR-PBCH signal and/or channel.

An SS-burst index may be used to indicate a radio frame number. When an SS-burst index indicates one or more $N_{burst}$ radio frames, the $N_{sf}$ system frames may be indicated as follows: SFN=f(SFN in PBCH, SS-burst index). SS-burst index may be represented by $\log_2(N_{burst})$ bits for SFN LSB, for example, which may be indicated using an SS burst. An SFN in PBCH may be represented by $\log_2(N_{sf})-\log_2(N_{burst})$ bits for SFN MSB, for example, which may be indicated in an NR-PBCH signal and channel.

Figure 6:
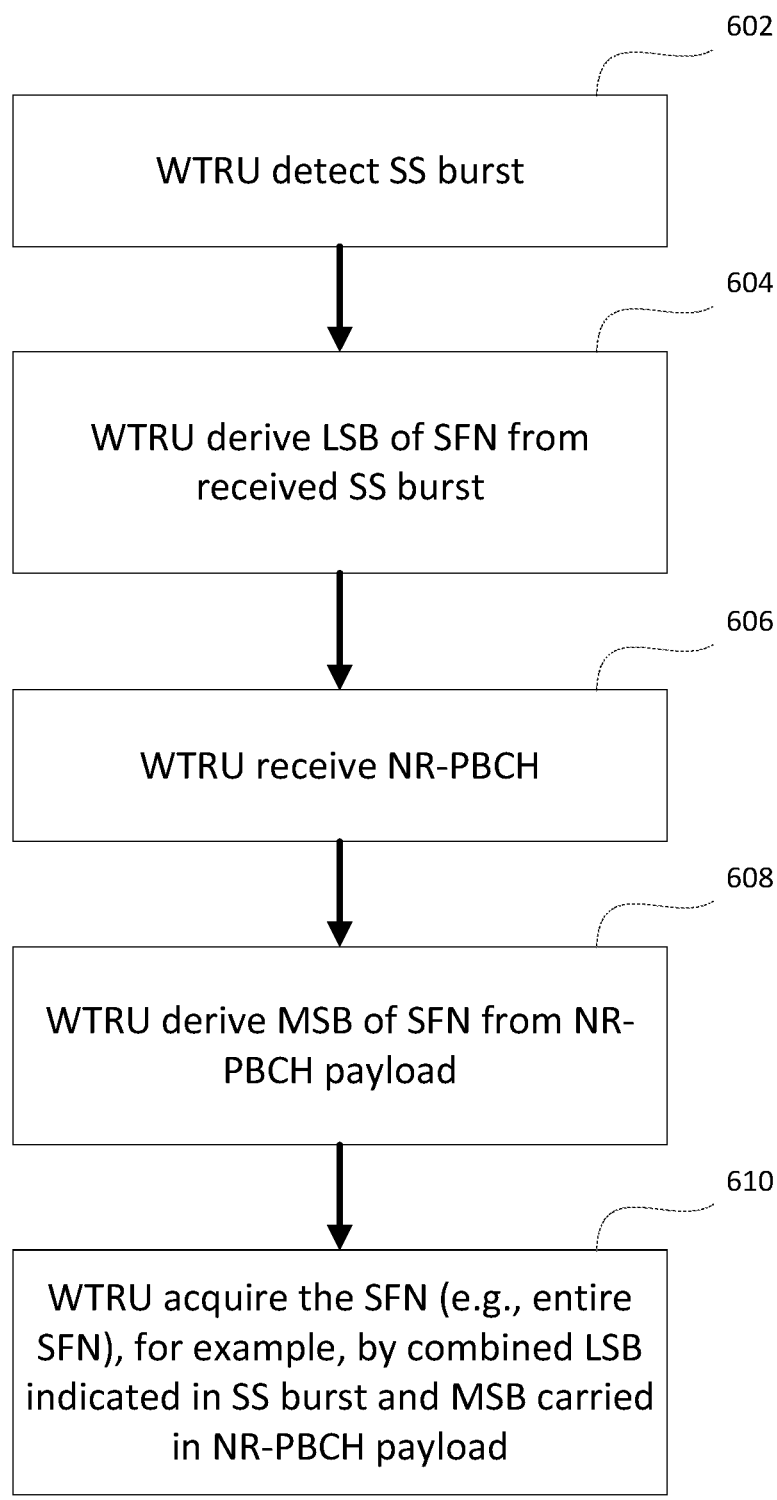
FIG. 6 shows another example system frame number acquisition.

FIG. 6 shows an example system frame number acquisition using an SS block and/or burst. A WTRU may detect an SS burst and/or the associated SS burst index, at 602. A WTRU may derive an LSB of an SFN from the received SS burst and/or the associated SS burst index, at 604. A WTRU may receive an NR-PBCH, at 606. A WTRU may derive an MSB of an SFN, at 608. For example, a WTRU may derive an MSB of an SFN from the received NR-PBCH payload. A WTRU may acquire the SFN (e.g., the entire SFN), at 610. For example, a WTRU may acquire the SFN by combining the LSB that may be indicated and/or carried in an SS burst and the MSB that may be indicated and/or carried in NR-PBCH signal and/or channel.

A multi-stage system frame acquisition may be provided.

Figure 7:
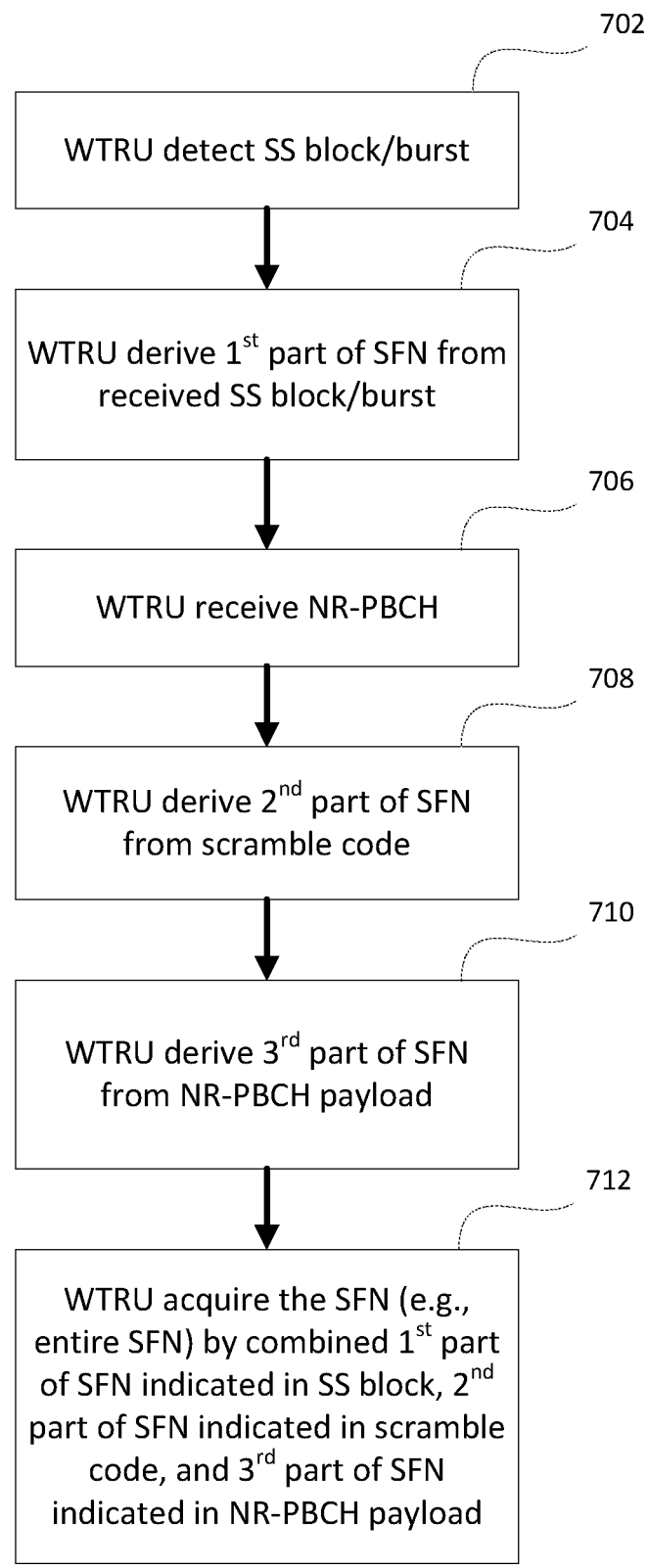
FIG. 7 shows an example multi-stage system frame number acquisition (3-stage).

FIG. 7 shows an example multi-stage system frame number acquisition (e.g., using a 3-stage approach). An SFN may be a function of one or more of the following parameters: an SS-block/burst index, scrambling codes, and/or an SFN in NR-PBCH. An SFN may be f (SS-block/burst index, scrambling codes, SFN in NR-PBCH).

An example multi-stage system frame number acquisition may be performed as follows. A WTRU may detect an SS block and/or burst, at 702. A WTRU may derive the first part of SFN from the received SS block/burst, at 704. The WTRU may receive an NR-PBCH, at 706. A WTRU may derive the second part of SFN from scramble codes, at 708. The WTRU may derive the $3^{rd}$ part of SFN from an NR-PBCH signal and/or channel (e.g., payload), at 710. A WTRU may acquire the SFN (e.g., the entire SFN), at 712. For example, a WTRU may acquire the SFN by combining the first part of the SFN indicated in the SS block, the second part of the SFN indicated in scramble codes, and/or the third part of the SFN indicated in the NR-PBCH payload (e.g., across the stages).

Figure 8:
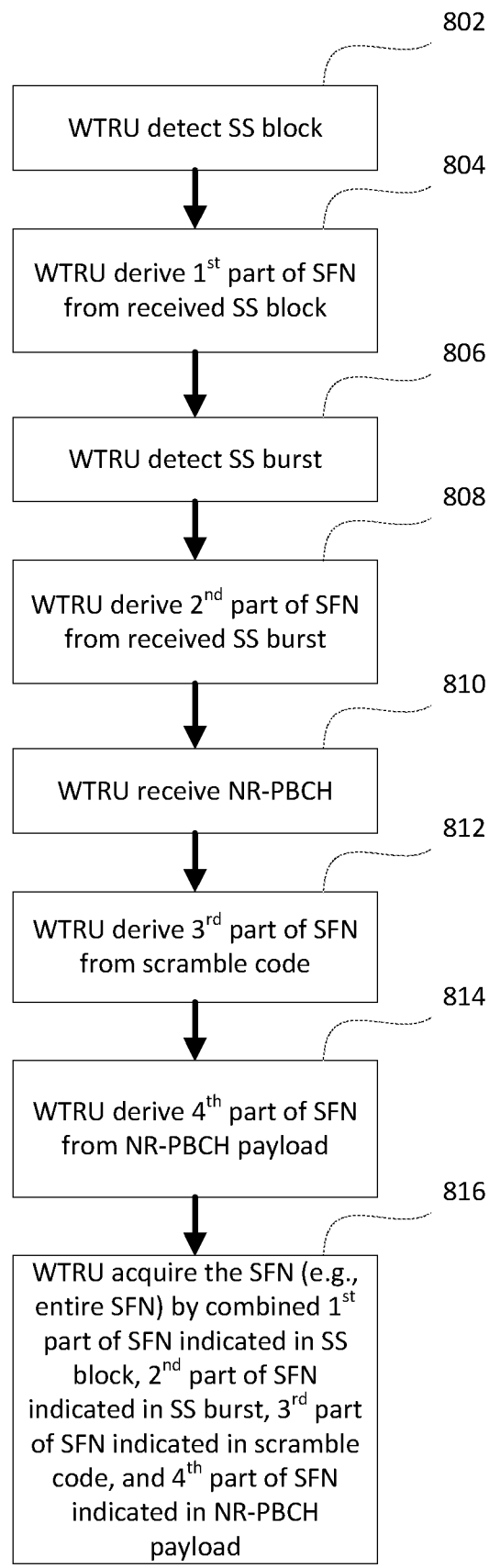
FIG. 8 shows an example multi-stage system frame number acquisition (4-stage).

FIG. 8 shows an example system frame number acquisition (e.g., a multi-stage system frame number acquisition, e.g., with 4 stage acquisition). SFN may be based on (e.g., a function of) one or more of the following parameters: an SS-block index, an SS-burst index, scrambling codes, and/or an SFN in NR-PBCH. An SFN may be f (SS-block index, SS burst index, scrambling codes, SFN in NR-PBCH). An example multi-stage system frame number acquisition may be performed as follows. A WTRU may detect an SS block, at 802. A WTRU may derive the first part of SFN from the received SS block, at 804. The WTRU may detect an SS burst, at 806. A WTRU may derive the second part of SFN from the received SS burst, at 808. The WTRU may receive an NR-PBCH, at 810. A WTRU may derive the 3rd part of SFN from a scramble code, at 812. The WTRU may derive the 4th part of SFN from an NR-PBCH payload, at 814.

At 816, the WTRU may acquire the SFN (e.g., the entire SFN). For example, the WTRU may acquire the SFN by combining the first part of SFN (e.g., indicated in SS block), the second part of SFN (e.g., indicated in SS burst), the third part of SFN (e.g., indicated in scramble code), and/or the fourth part of SFN (e.g., indicated in NR-PBCH payload) (e.g., across the stages).

Figure 9:
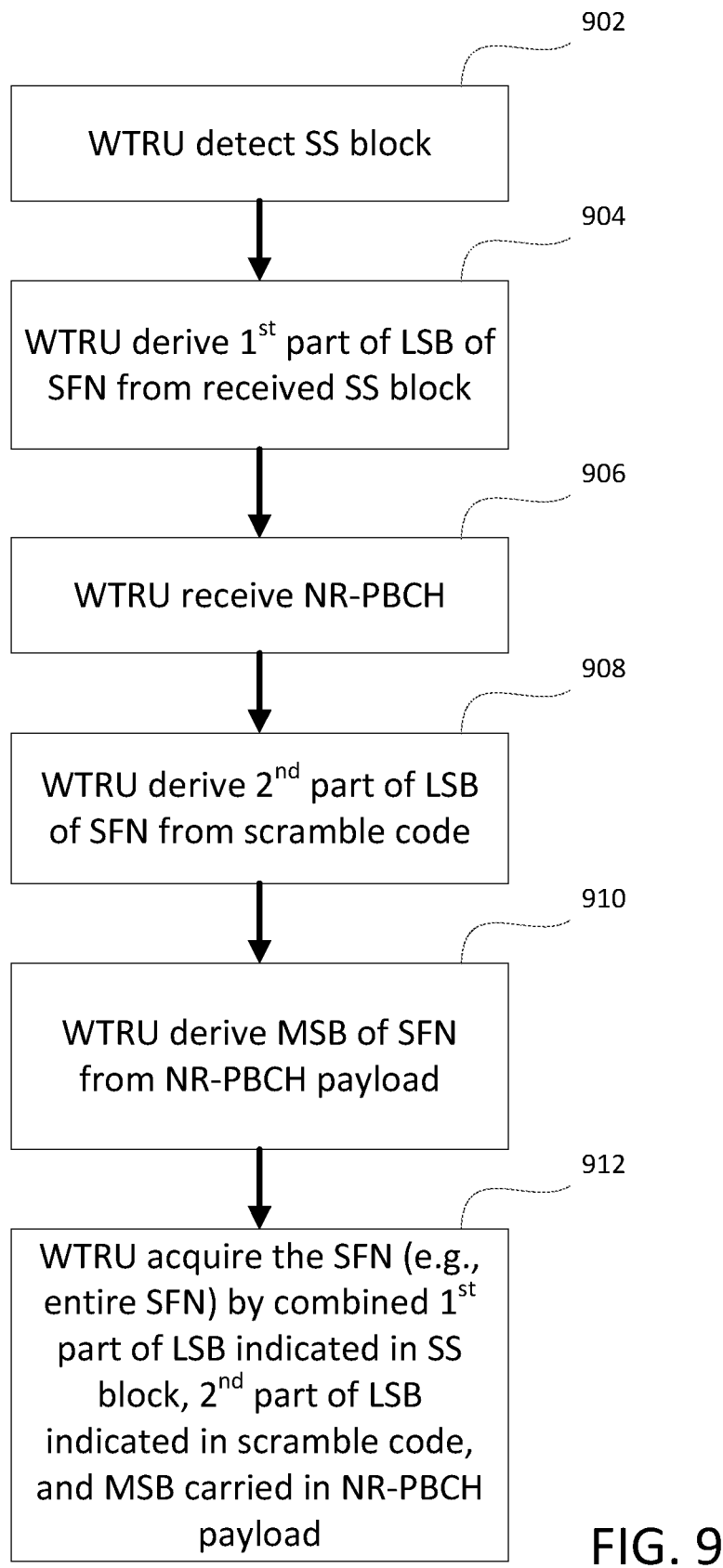
FIG. 9 shows another example multi-stage system frame number acquisition.

FIG. 9 shows an example multi-stage system frame number acquisition. The example multi-stage system frame number acquisition may be performed as follows. A WTRU may detect an SS block, at 902. The WTRU may derive the first part of an LSB of SFN from the received SS block, at 904. The WTRU may receive NR-PBCH, at 906. A WTRU may derive the second part of an LSB of SFN from a scramble code, at 908. The WTRU may derive the MSB of SFN from NR-PBCH payload, at 910.

A WTRU may acquire the SFN (e.g., the entire SFN), at 912. For example, a WTRU may acquire the SFN by combining the first part of LSB of SFN (e.g., indicated in SS block), the second part of LSB of SFN (e.g., indicated in scramble code), and/or the MSB of SFN (e.g., indicated in NR-PBCH payload) in the stages.

A system frame acquisition may be provided. One or more of the following may apply.

A WTRU may receive an SS block signal.

A WTRU may detect an SS block time indication within a SS burst set. The SS block time indication may be denoted as $SS_{block\_index}$ which may range from 0 to L-1, e.g., $SS_{block\_index}$=0, 1, 2, . . . , L-1.

A WTRU may derive the first part of an SFN from the detected SS block time indication $SS_{block\_index}$. For example, a WTRU may derive the first part of an SFN from the detected SS block time indication via the following equation:

$$\text{The first part of } SFN = \text{floor}\left(\frac{2 \times SS_{block\_index}}{L}\right)$$

The first part of an SFN may be 0 or 1.

The WTRU may descramble the NR-PBCH signal and/or decode the NR-PBCH channel.

The WTRU may descramble the NR-PBCH signal using scramble codes and/or the shifted versions of the scramble codes.

Scramble codes may be scramble codes 0, 1, 2, . . . , Z-1. Scramble codes 0, 1, 2, . . . , Z-1 may be referred to as original scramble codes.

Scramble codes shift (e.g., with J codes shift) may be scramble codes J, J+1, . . . , Z-1, 0, 1, . . . , J-1. Scramble codes shift may be J codes circular shift of the original scramble codes.

A WTRU may determine (e.g., derive) the number of bits for the second part of an SFN based on the following equation:

$$\text{Number of bits of the second part of } SFN = \log_2(N_{scramble_{code_{shift}}})$$

A WTRU may determine (e.g., derive) bit contents (e.g., exact bit contents) for the second part of an SFN from the detected scramble codes shift, for example, by the following table (assuming J=4 shifts):

TABLE 1 the second part of SFN (J = 4)

| Scramble Code Shift (J) | second part of SFN |
|---|---|
| 0 | 00 |
| 1 | 01 |
| 2 | 10 |
| 3 | 11 |

For J=8, the second part of SFN may be 000, 001, 010, 011, 100, 101, 110, and/or 111.

A WTRU may obtain the 3rd part of an SFN from NR-PBCH payload. The 3rd part of the SFN may equal the SFN bits carried (e.g., explicitly carried) by the PBCH.

Figure 10:
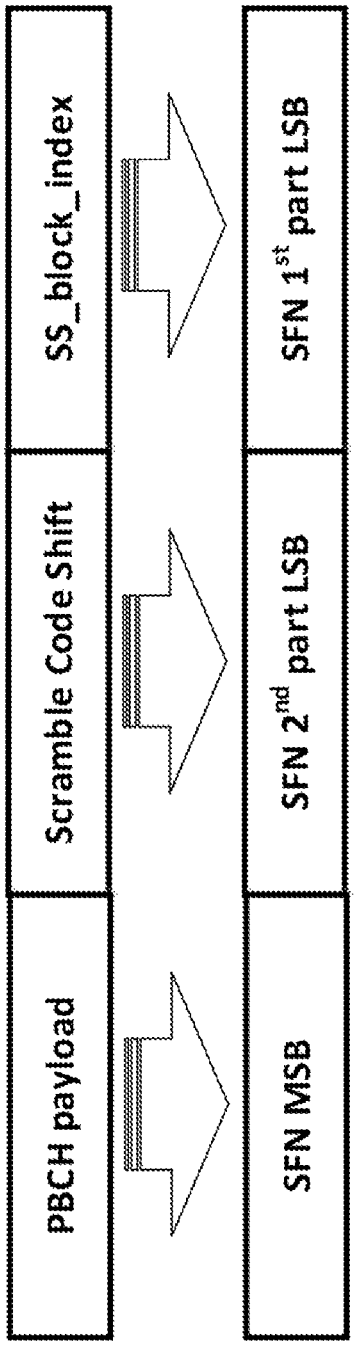
FIG. 10 shows an example system frame number (SFN) acquisition by detecting, decoding, concatenating, and combining most significant bits (MSBs) and multiple least significant bits (LSBs) of an SFN.

A WTRU may acquire the SFN (e.g., the entire SFN) by concatenating and/or combining the first part of an SFN derived from an SS block, the second part of an SFN derived from a scramble code, and/or the $3^{rd}$ part of an SFN carried in an NR-PBCH payload. An example of the concatenating and/or combining may be depicted in FIG. 10.

For example, if $b_{x-1}, \ldots, b_1, b_0$ are obtained via SS block index; $b_{y-1}, b_1, b_0$ are obtained via detected scramble codes and shifts; and/or $b_{z-1}, \ldots, b_1 b_0$ are obtained via decoded PBCH payload, the SFN (e.g., the entire SFN) may be:

$$SFN = b_{z-1}, \ldots, b_{y-1}, \ldots, b_1, b_0, b_{y-1}, \ldots, b_1, b_0$$

Figure 11:
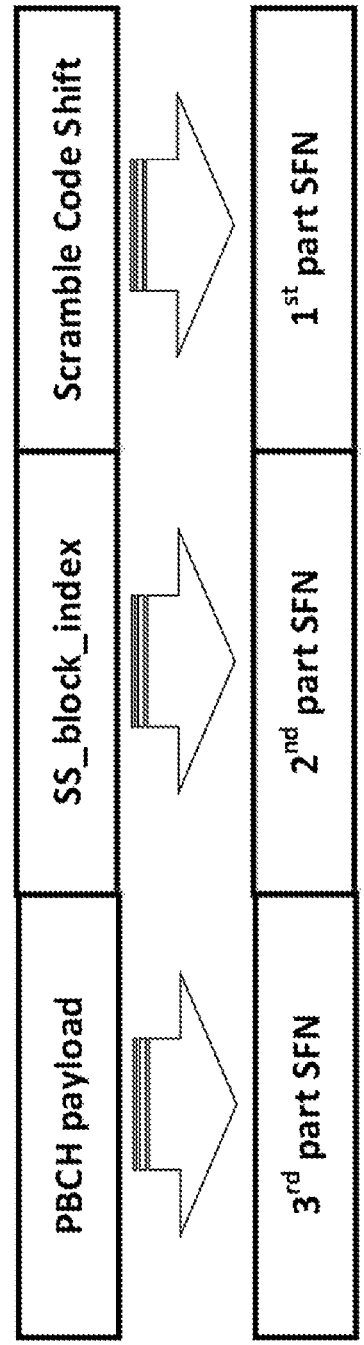
FIG. 11 shows an example SFN acquisition by detecting, decoding, concatenating, and combining multiple parts of an SFN.

One or more (e.g., different) parts of SFN bits may be obtained via one or more (e.g., different) combinations of an PBCH payload, SS block index, and/or scramble code and shift. The first part of SFN bits may be acquired via detected scramble code and shift, the second part of SFN bits may be acquired via SS block index or time index, and/or the 3rd part of SFN bits may be acquired via PBCH payload, for example, based on the design and system parameters. An example of the acquisition may be depicted in FIG. 11. One or more (e.g., different) parts of SFN bits may be obtained and/or acquired, for example, by detecting and/or decoding an SS block and PBCH signal and channel. The one or more (e.g., different) parts of SFN bits may be concatenated and/or combined to form a set (e.g., the final set) of SFN bits.

An SS block index may be carried in a PBCH. For example, an SS block index may be carried in a PBCH explicitly in payload and/or implicitly in signal. For example, as provided herein, explicitly may refer to the indication being in the form of bits which may be carried as payload in the PBCH. Implicitly may refer to the indication being part of a signal, for example, an initialization of signal and/or shift in signal and not included (e.g., explicitly included) as part of the payload.

An operation mode-based system frame may be acquired.

Periodicities (e.g., a set of periodicities for an SS burst set) may be used. A periodicity may be predefined as a default periodicity for an SS burst set transmission. The default periodicity may be denoted by $N_{default}$ radio frames. A set of periodicities may be denoted by $N_{adapt,1}$, $N_{adapt,2}, \ldots, N_{adapt,Q}$ radio frames.

A WTRU may detect an SS block, for example, based on a default periodicity. For example, in an initial access, a WTRU may detect an SS block based on a default period-icity. The WTRU may derive the first part of an SFN from the detected SS block time indication $SS_{block\_index}$ using the following equation:

$$\text{The first part of } SFN = \text{floor}\left(\frac{N_{default} \times SS_{block\_index}}{L}\right)$$

A WTRU may use a default periodicity and/or one or more of the periodicities in the set of periodicities. For example, during idle mode, a WTRU may use a default periodicity and/or one or more of the periodicities in the set of periodicities. A network may indicate the periodicity to the WTRU. After the WTRU receives the indicated periodicity, the WTRU may override the default periodicity. Such periodicity for adaptation may be indicated using NR-PBCH. NR-PBCH may carry one or more (e.g., a few) bits to indicate the periodicity. The WTRU may obtain an updated periodicity. For example, the WTRU may obtain the updated periodicity after WTRU decodes NR-PBCH. Such periodicity for adaptation may be indicated using minimum system information.

A WTRU may derive the first part of an SFN from the detected SS block time indication $SS_{block\_index}$ using the following equation:

$$\text{The first part of } SFN = \text{floor}\left(\frac{N_{adapt,i} \times SS_{block\_index}}{L}\right)$$

During RRC connected mode, the WTRU may use one or more of the periodicities in the set of periodicities. The network may indicate the periodicity to the WTRU. After the WTRU receives the indicated periodicity, the WTRU may override a previously used periodicity. Such periodicity for adaptation may be indicated using a dedicated signaling (e.g., RRC signaling). The RRC signaling may carry one or more (e.g., a few) bits to indicate the periodicity dedicated to a WTRU.

A WTRU may derive the first part of an SFN from the detected SS block time indication $SS_{block\_index}$ using the following equation:

$$\text{The first part of } SFN = \text{floor}\left(\frac{N_{adapt,j} \times SS_{block\_index}}{L}\right)$$

System Frame Acquisition with Confirmation may be performed.

Figure 12:
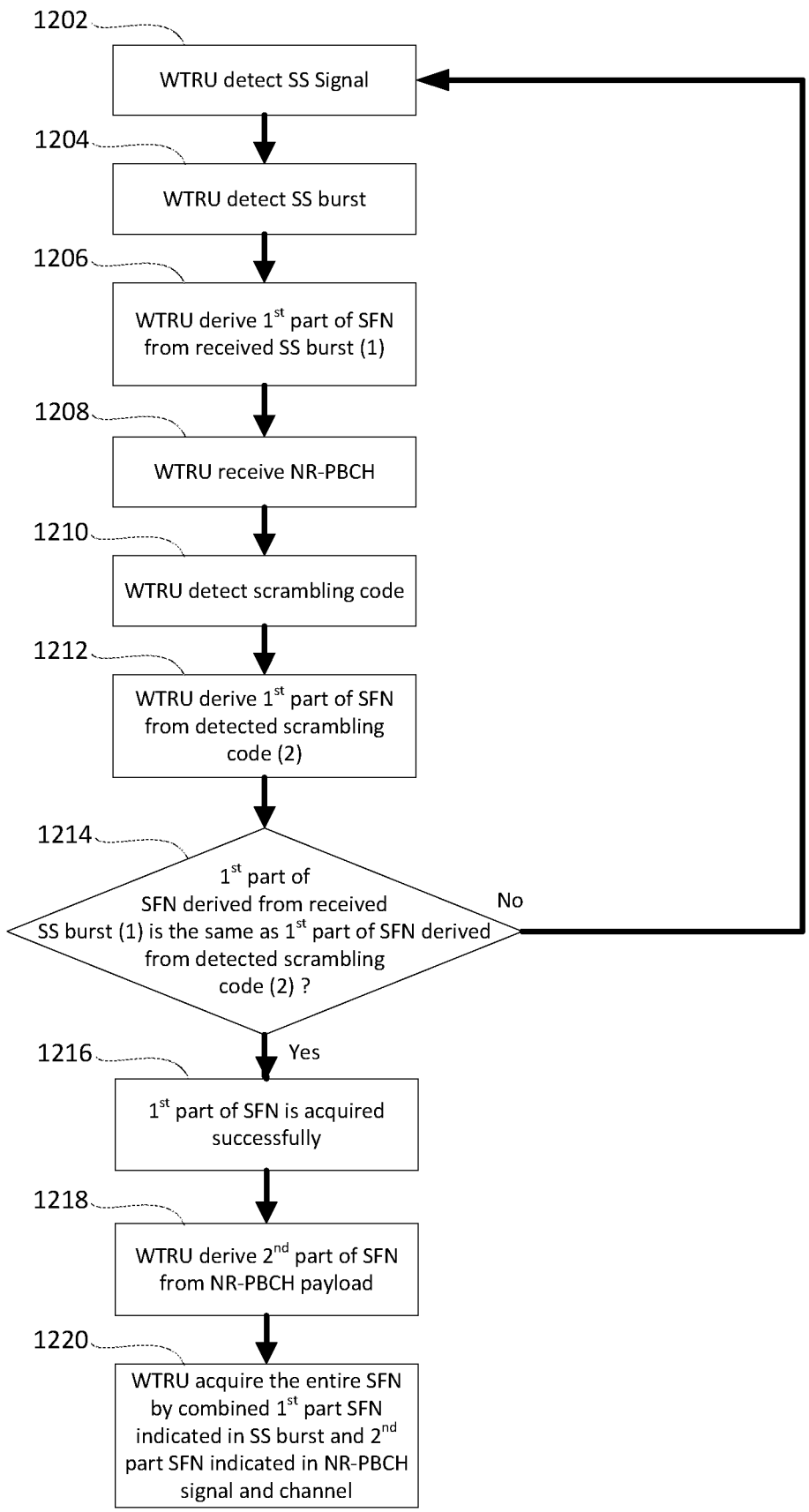
FIG. 12 shows an example system frame number acquisition with Confirmation 1.

System frame number may be acquired, for example, with confirmation. FIG. 12 shows an example system frame number acquisition with confirmation. One or more of the following may be performed. A WTRU may receive and/or detect an SS Signal, at 1202. The WTRU may receive and/or detect an SS burst, at 1204. A WTRU may derive a first part of an SFN from a received SS burst, at 1206. A WTRU may receive an NR-PBCH signal and/or channel, at 1208. A WTRU may detect a scrambling code, at 1210. A WTRU may derive a first part of an SFN from a detected scrambling code, at 1212.

At 1214, a WTRU may compare the first part of an SFN (e.g., the first part of the SFN derived from the received SS burst). If the first part of the SFN derived from the received SS burst is not the same as the first part of SFN derived from the detected scrambling code, the WTRU may detect an SS Signal, at 1202. If the first part of an SFN derived from the received SS burst is the same as the first part of an SFN derived from the detected scrambling code, the WTRU may confirm that the first part of the SFN is acquired successfully, at 1216.

A WTRU may derive the second part of an SFN from an NR-PBCH signal and/or channel (e.g., payload), at 1218. A WTRU may determine (e.g., acquire) the SFN (e.g., the entire SFN), at 1220. For example, a WTRU may acquire the SFN by combining the first part of an SFN (e.g., indicated in an SS burst) and the second part of an SFN (e.g., which may be indicated in an NR-PBCH, such as a signal and/or payload in the NR-PBCH).

An example of a system frame number acquisition with confirmation may be performed as follows. For example, a system frame number or a portion of a system frame number may be conveyed to WTRU. The system frame number may be conveyed to a WTRU in one or more ways (e.g., more than one ways simultaneously). A system frame number may be conveyed to WTRU by a scrambling sequence or a scrambling code, for example, used for PBCH. A system frame number may be conveyed to a WTRU by a PBCH payload at the same time. Bits may be conveyed to the WTRU. For example, an even or uneven number of bits may be conveyed to WTRU. The same or different bits for a system frame number may be conveyed to WTRU (e.g., using one or more ways). For example, an X bits system frame number may be conveyed to WTRU (e.g., via PBCH payload) and a Y bits system frame number may be conveyed to WTRU (e.g., via PBCH scrambling). X may be 10 bits and Y may be 2, 3 or 4 bits. Y may be a subset of X. For example, a portion (e.g., a first portion) of bits for system frame number may be conveyed to WTRU (e.g., via scrambling sequence or code), and another portion (e.g., second portion) of bits for system frame number may be conveyed to WTRU (e.g., via PBCH payload). The first portion and the second portion of bits for system frame number may overlap (e.g., completely overlap or partially overlap). The first portion and the second portion of bits for system frame number may not overlap. When the first portion and the second portion of bits for system frame number completely overlap, the first portion and the second portion of bits for system frame number may be the same. When the first portion and the second portion of bits for system frame number partially overlap, some of the first portion and the second portion of bits for system frame number may be the same. When the first portion and the second portion of bits for system frame number do not overlap, the first portion and the second portion of bits for system frame number may not be the same. The portion of bits for system frame number being the same may be used for confirmation.

Figure 13:
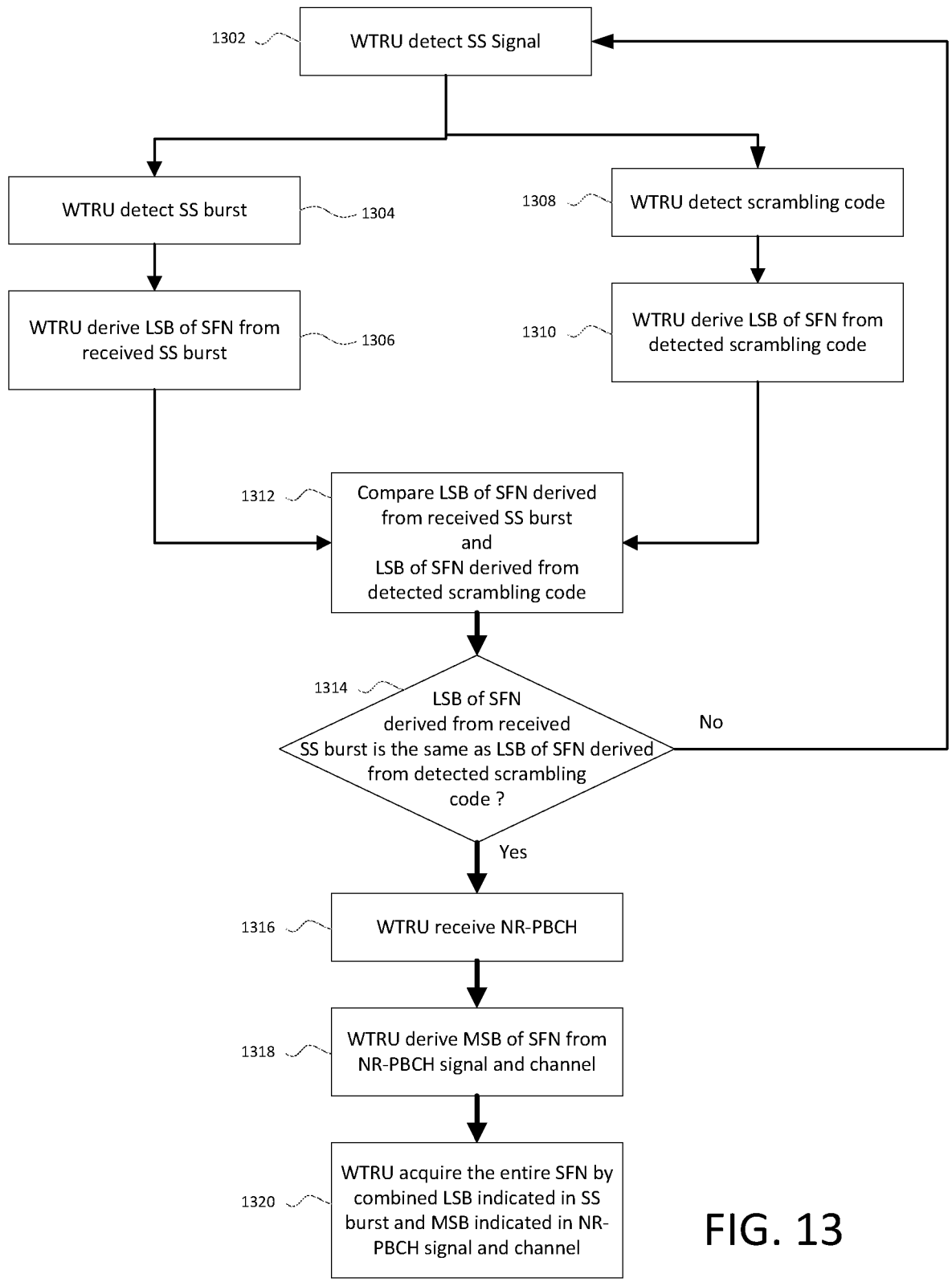
FIG. 13 shows an example system frame number acquisition with Confirmation 2.

FIG. 13 shows an example of the system frame number acquisition with confirmation. A WTRU may detect an SS signal, at 1302. The WTRU may detect an SS burst and/or SS block, at 1304. A WTRU may derive an LSB of an SFN, at 1306. For example, the WTRU may derive an LSB of an SFN from a received SS burst and/or SS block. A WTRU may (e.g., may at the same time) detect scrambling codes, at 1308. A WTRU may derive an LSB of an SFN from a detected scrambling code, at 1310.

A WTRU may compare the LSB of an SFN derived from a received SS burst and/or the LSB of an SFN derived from a detected scrambling code, at 1312. If the LSB of an SFN (e.g., derived from a received SS block or SS burst, such as from a PBCH payload in an SS block or burst) is not the same as the LSB of an SFN derived from a detected scrambling code, at 1314, the WTRU may detect an SS Signal, at 1302. If the LSB of an SFN (e.g., derived from a received SS block or burst, such as from a PBCH payload in an SS block or burst) is the same as the LSB of an SFN derived from detected scrambling code, at 1314, the WTRU may confirm that an LSB of an SFN is acquired successfully. A WTRU may receive an NR-PBCH signal and/or channel, at 1316. A WTRU may derive an MSB of an SFN from an NR-PBCH signal and/or channel (e.g., from a PBCH payload in SS block or burst), at 1318. A WTRU may acquire the SFN (e.g., the entire SFN), at 1320. For example, the WTRU may acquire the SFN by combining the LSB indicated in an SS block or burst and the MSB indicated in an NR-PBCH signal and/or channel.

An SS block or SS burst may comprise one or more of a PSS, a SSS, and/or PBCHs. A PBCH may comprise a PBCH payload and/or a PBCH data demodulation reference signal (DMRS). A PBCH payload or bits may be scrambled, for example, with a scrambling sequence or code. A scrambling sequence or code may be based (e.g., entirely or partially based) on a cell ID. A scrambling sequence or code may be a function of a cell ID or a function of cell ID and other ID(s) and/or index (indices). For example, a scrambling sequence or code may be a function of a cell ID and/or timing information. A scrambling sequence or code may be determined by a cell ID and/or timing information index (e.g., an SS block index, SFN, or the like).

One or more SFN acquisitions may be used for one or more SS burst set periodicities, e.g., to optimize system performance. For example, an SFN acquisition may be used and/or associated with a periodicity and/or another SFN acquisition may be used and/or associated with another periodicity.

SS Periodicity based system frame acquisition with periodicity adaptation may be performed.

Figure 13A:
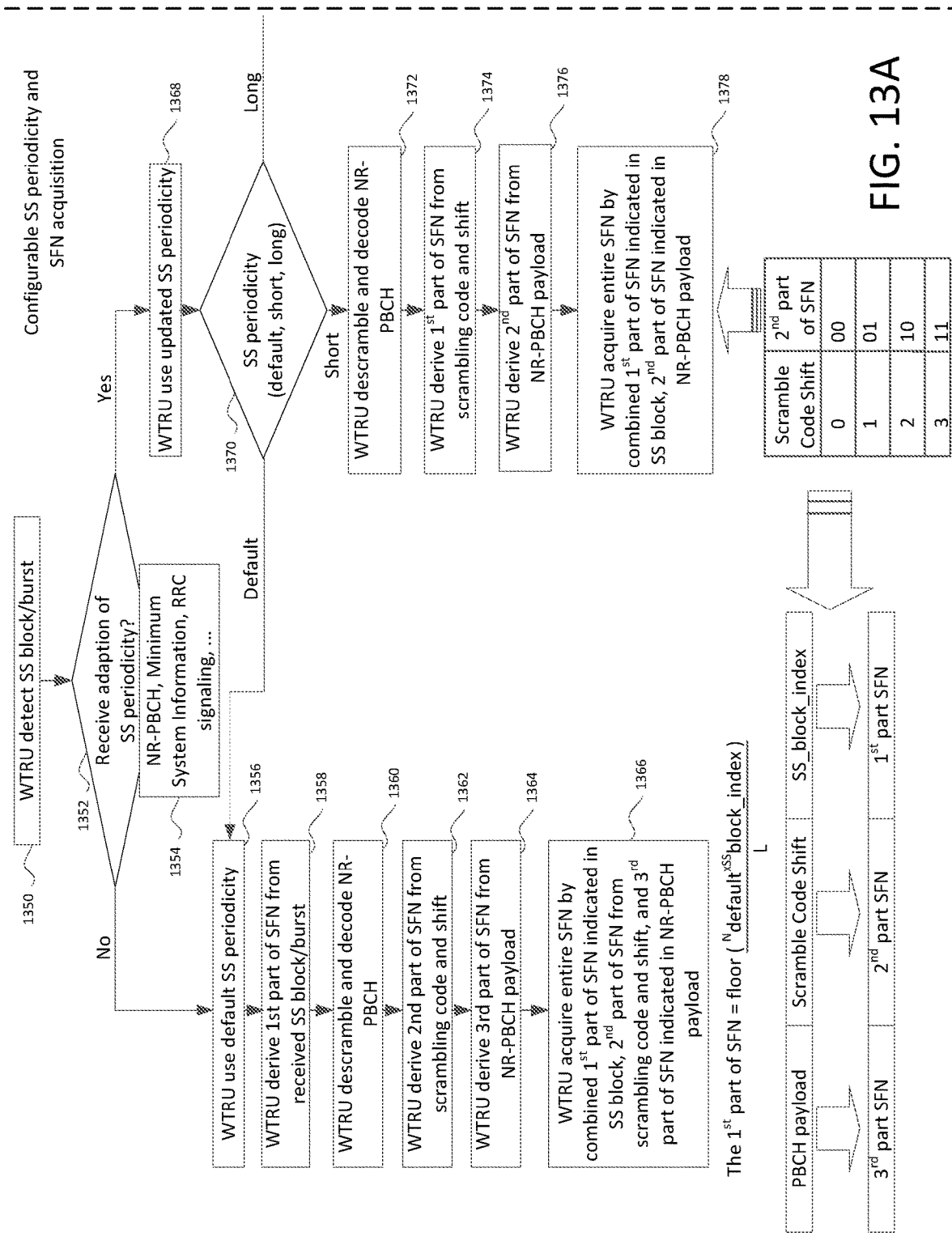
FIGS. 13A, 13B show an example flow for a system frame acquisition with periodicity adaptation.
Figure 13B:
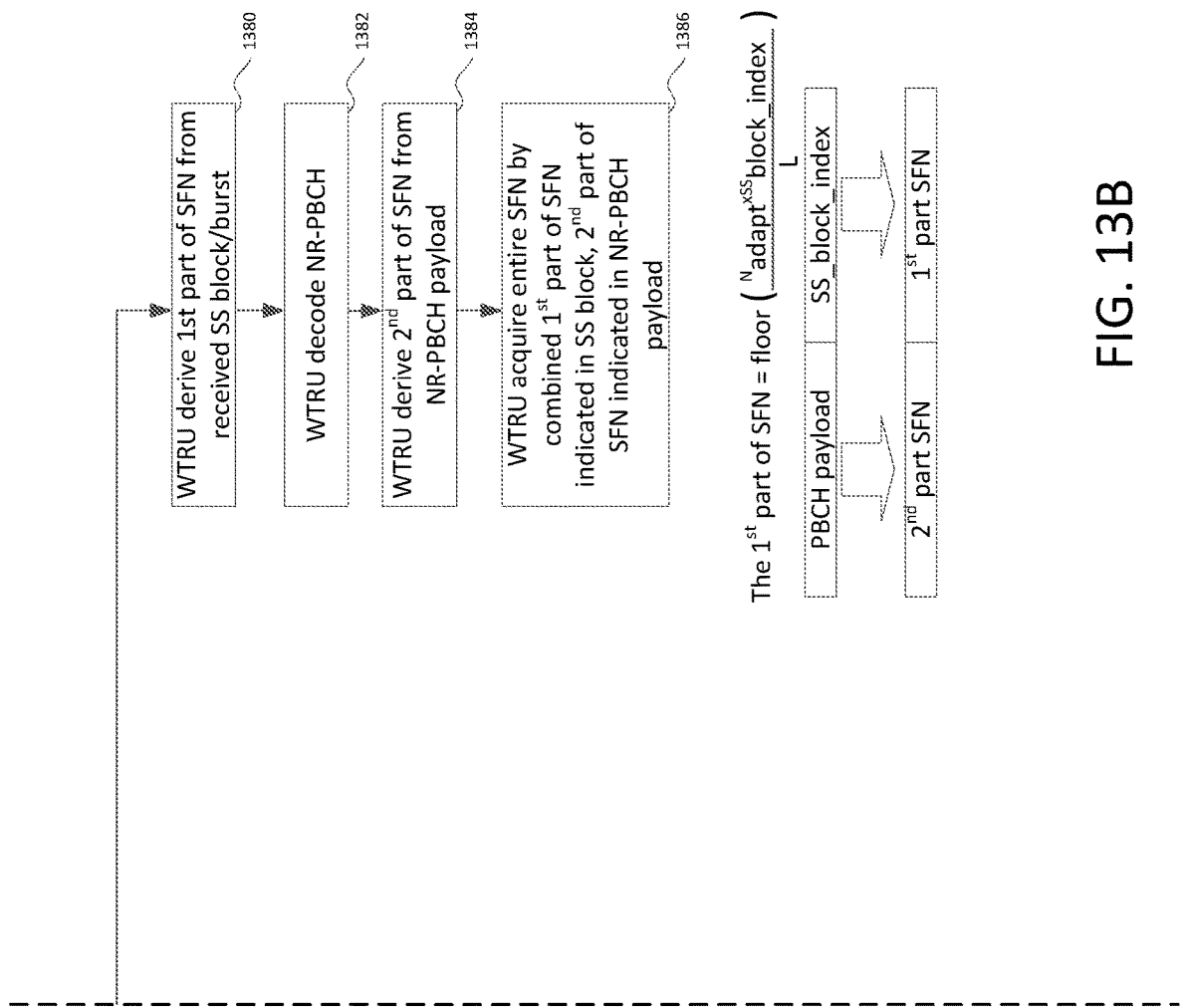

FIGS. 13A, 13B show example flows for a system frame acquisition with periodicity adaptation. FIGS. 13A, 13B describe features that may be associated with system frame acquisitions with periodicity adaptations. For example, the features may include one or more of the following.

The WTRU may detect and/or receive a signal as a SS block burst, at 1350. The WTRU may determine if an adaptation (e.g., adaptation information) of an SS burst set periodicity is received, at 1352. The WTRU may receive adaptation information of an SS burst set periodicity and/or transmitted SS blocks from NR-PBCH, minimum system information, and/or RRC signaling, at 1354. For example, the WTRU may receive NR-PBCH, minimum system information, and/or RRC signaling to obtain and/or determine the adaptation information. The WTRU may receive adaptation information from NR-PBCH, minimum system information, and/or RRC signaling to adapt and/or update the SS burst set periodicity.

If no adaptation is received, the WTRU may use a default periodicity (e.g., a default SS periodicity) for detection. For example, a default SS burst set periodicity may be 20 ms and/or $N_{default}$ may equal 2 radio frames. A radio frame may be 10 ms.

If an adaptation is received, a predefined set of periodicities may be used, at 1368. A predefined set of periodicities may be {5 ms, 10 ms, 20 ms, 40 ms, 80 ms, 160 ms} and/or $N_{adapt}$ may equal {0.5, 1, 2, 4, 8, 16}.

The periodicities may be short or long. The periodicities may be default.

If no adaptation of periodicity is received, the WTRU may use a default SS burst set periodicity, at 1356. During the default SS burst set periodicity, a part (e.g., the first part) of an SFN may be derived, at 1358. For example, a part (e.g., the first part) of an SFN may be derived from the received SS block and/or SS burst. The WTRU may derive the first part of an SFN from the SS block index or time index. The SS block index or time index may be indicated (e.g., implicitly indicated) by NR-PBCH DMRS. The WTRU may derive the first part of an SFN from (e.g., directly from) NR-PBCH DMRS. The WTRU may derive the first part of an SFN from the SS block index or time index indicated (e.g., explicitly indicated) by NR-PBCH. The WTRU may decode NR-PBCH, for example, to obtain an SS block index or time index (e.g., if needed). SFN_1 may equal a floor (Ndefault×SSBlockID/L). The WTRU may detect, descramble, and/or decode NR-PBCH, at 1360. The WTRU may derive the second part of the SFN, at 1362. For example, the WTRU may derive the second part of the SFN from the scrambling code and/or shift (SFN_2). The WTRU may follow Table 2.

TABLE 2

| Scramble Code Shift | second part of SFN |
|---|---|
| 0 | 00 |
| 1 | 01 |
| 2 | 10 |
| 3 | 11 |

The WTRU may derive the third part of SFN, at 1364. For example, the WTRU may derive the third part of SFN from the PBCH payload. (SFN_3). The parts (e.g., three parts) of SFN may be combined, at 1366. For example, the parts (e.g., three parts) of SFN may be combined to generate an entire SFN [SFN_3, SFN_2, SFN_1].

Adaptation of periodicity may be received. If adaptation of periodicity is received, the WTRU may determine, at 1370, if the periodicity is long or short. The WTRU may determine if the periodicity is default.

For short periodicity adaptation, one or more of the following may apply. For short periodicity adaptation, the WTRU may detect, descramble, and/or decode NR-PBCH, at 1372. For short periodicity adaptation, the WTRU may derive the first part of SFN from the scrambling code and/or shift as described herein (SFN_1), at 1374. For short periodicity adaptation, the WTRU may derive the second part of SFN from the PBCH payload (SFN_2), at 1376. The two parts may be combined, at 1378. For example, the two parts may be combined to generate SFN [SFN_2, SFN_1] (e.g., an entire SFN [SFN_2, SFN_1]).

For a long periodicity adaptation, one or more of the following may apply. For a long periodicity adaptation, the WTRU may derive the first part of the SFN from the received SS block or SS burst, at 1380. For example, the WTRU may derive the first part of the SFN from the SS block index or time index indicated (e.g., implicitly indicated) by NR-PBCH DMRS. The WTRU may derive the first part of the SFN from (e.g., directly from) NR-PBCH DMRS. The WTRU may derive the first part of SFN from the SS block index or time index indicated (e.g., explicitly indicated) by NR-PBCH. The WTRU may decode NR-PBCH, at 1382. For example, the WTRU may decode NR-PBCH to obtain an SS block index or time index (e.g., if needed). For a long periodicity adaptation, SFN_1 may equal a floor (Nadapt,i×SSBlockID/L). For a long periodicity adaptation, the WTRU may detect, descramble, and/or decode NR-PBCH. For a long periodicity adaptation, the WTRU may derive the second part of an SFN from the PBCH payload (SFN_2), at 1384. The parts (e.g., two parts) may be combined to generate an entire SFN [SFN_2, SFN_1], at 1386.

For a default periodicity adaptation, the WTRU may perform as described herein. For example, for a default periodicity adaptation, the WTRU may perform as described as if no adaptation of periodicity is received. One or more of the following may apply.

An indicator may be used to identify and/or acquire a 5 ms timing indication, boundary, and/or $N_{adapt}$ may equal a 0.5 radio frame timing indication. The indicator may be a 1-bit indicator. The indicator may be carried by NR-PBCH, remaining minimum system information (RMSI), and/or RRC signaling. The indicator (e.g., one-bit indicator) may be indicated (e.g., indicated implicitly) via DMRS, such as NR-PBCH DMRS.

An SFN may be derived from one or more of the following. An SFN may be derived from PBCH-DMRS. An SFN may be derived from an SS block index and/or an SS block timing index. An SFN may be derived from scrambling codes. An SFN may be derived from a PBCH payload. An SFN may be derived from a CRC masking.

The features (e.g., solutions) described herein may be applied to a hyper SFN (H-SFN).

One or more SS signal and/or sequence features may be performed.

One or more SS sequences (e.g., with SS bursts) may be performed using a Zadoff-Chu sequence, or the like. Sequence lengths may be selected to accommodate and/or verify one or more (e.g., different) SS bandwidths and/or one or more (e.g., different) sizes of FFT. For example, Zadoff Chu of Length 63 (ZC63), Zadoff Chu of Length 127 (ZC127), and/or Zadoff Chu of Length 277 (ZC255).

For a sequence length (e.g., each sequence length), roots may be selected. For example, roots may be selected so that the best performance of an SS signal and/or burst detection may be achieved. One or more of the following may be performed, for example, for a root. A value for a root may vary from 1 to N−1. N may be the length of Zadoff-Chu sequence. A ZC Sequence may be generated using equation zcSeq(n+1)=exp(−j*(pi*root*n*(n+1))/N). 'n' may be the sample point for which the value is computed and/or 'N' may be the length of sequence. "root" may be the root used to generate the sequence. The threshold for detection may be computed for a root. The computation of the root may be performed using simulation in additive white Gaussian noise (AWGN) channel at SNR of 0 dB. A sequence may not be transmitted from the transmitter, and/or the receiver may determine (e.g., compute) a correlation of the data received from the channel. A detection threshold may be selected, and/or the detection threshold may give the probability of a false alarm equal to 0.1. A PSS transmission may be performed in a CDL channel model. 1 parts per million (PPM) of carrier frequency offset (CFO) may be added to data after passing through the channel model. AWGN at one or more (e.g., different) values of SNR may be used. The received data may be correlated with a PSS sequence replica. The highest peak may be compared to the threshold selected. Comparing the highest peak to the threshold selected may determine the probability of detection at the SNR (e.g., the selected SNR). Probability of detection versus root selected for Zadoff Chu sequence may be plotted. A root may be selected. For example, the root with the best detection performance may be selected. Selecting the root with the best detection performance may indicate that there was no-flooring of probability of detection with increased SNR, e.g., in a 1 PPM CFO case.

Figure 14:
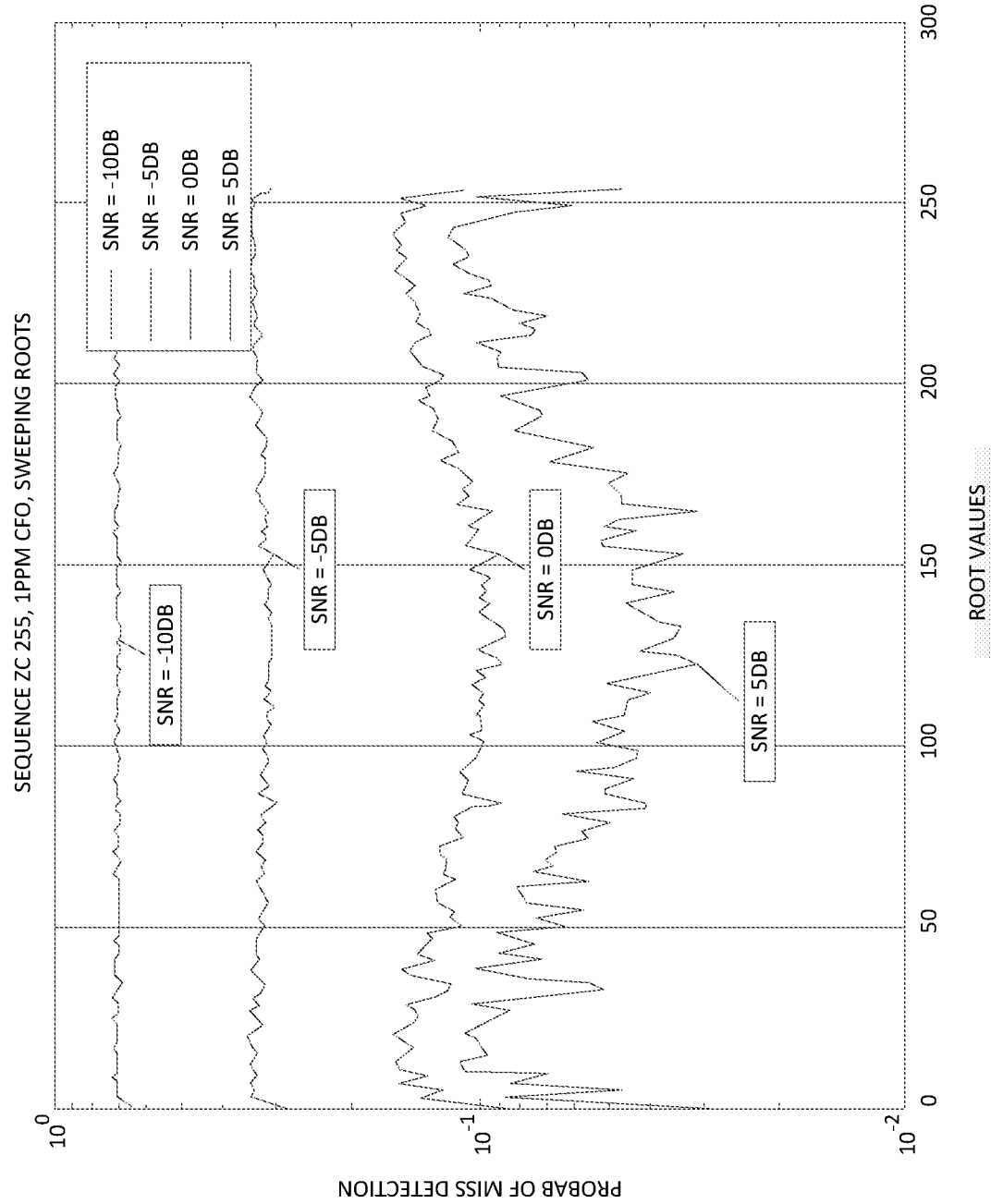
FIG. 14 shows an example sweeping root for a ZC255 sequence.
Figure 15:
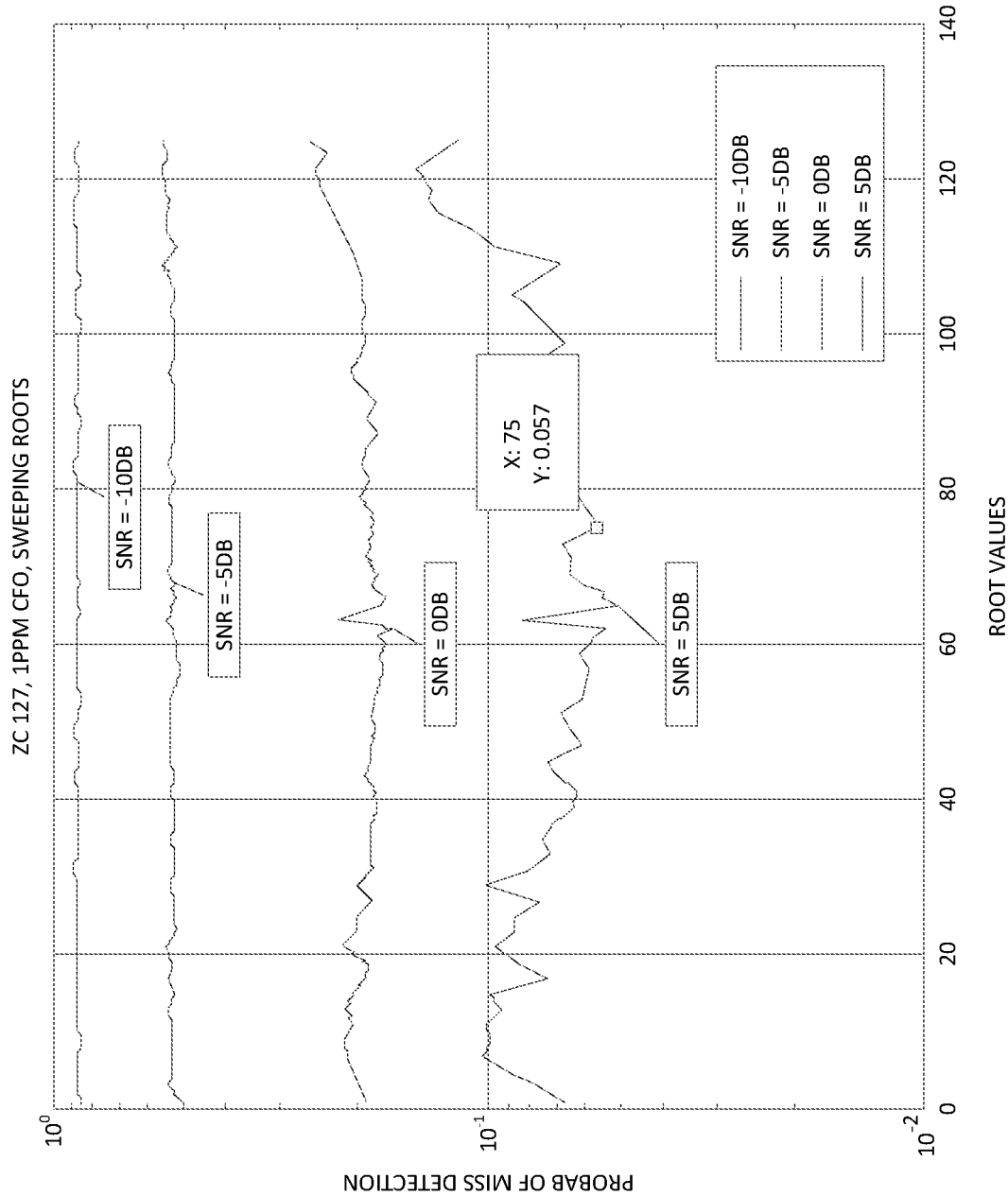
FIG. 15 shows an example sweeping root for a ZC127 sequence.

FIG. 14 illustrates the performance for a ZC255 sequence. The performance at low-SNR may be consistent for one or more (e.g., all) of the roots. In a higher SNR (e.g., with added CFO), some of the roots may show flooring performance and/or may perform poorly. For example, the selected root 1 performed the best in the example shown in FIG. 14. As shown in FIG. 15, the root value of 62 may be selected for ZC127. As shown in FIG. 14, the root value of 1 may be selected for ZC255. For the ZC63 sequence, one of the roots selected in LTE (e.g., root index number or root index 29) may be used.

FIG. 14 and FIG. 15 illustrate example performances for a ZC255 sequence and/or a ZC127 sequence, respectively. The performance at low-SNR may be consistent for one or more (e.g., all) of the roots. In the higher SNR (e.g., with added CFO), one or more of the roots may show flooring performance and/or may perform poorly. As shown in FIG. 14, the root 1 performed the best for ZC 255. Other roots may include 123 and/or 165. As shown in FIG. 15, the roots that gave the best performance were 62, 65, and/or 75 for ZC127.

As shown in FIG. 15, the root value of 62 may be selected for ZC127. As shown in FIG. 14, the root value of 1 may be selected for ZC255. For the ZC63 sequence, one of the roots selected (e.g., in LTE), for example, root index number or root index 29, may be used.

Sequences (e.g., the basic sequences) may include one or more of the following. Root index 62 may be used for ZC127 and/or root index 1 may be used for ZC255. The root index 65 and/or 75 may be used for ZC127. The root index 123 and 165 may be used for ZC255.

Sequences (e.g., the basic sequences) may be used as a basic component to construct longer sequence(s) using frequency repetition, time repetition, and/or frequency and time repetition.

One or more (e.g., different) PSS sequences may be constructed using one or more (e.g., three) basic sequences (e.g., using a selected root) and/or one or more (e.g., different) repetition patterns. Constructing one or more PSS sequences using one or more basic sequences (e.g., using a selected root) and/or one or more repetition patterns may include one or more of the following. One or more zeros for an FFT size, sequence length, and/or number of repetitions may be computed. zpLen=floor((nFFT−zcSegLen*zcRep−1)/2), where zpLen may be the length of zero padding on one or more (e.g., either) sides of the sequence. nFFT may be an FFT size. zcSeqLEn may be the length of a ZC Sequence. zcRep may be the number of repetitions of ZC sequence. 1 may account for DC.

A construction with repetition may be performed.

Figure 16:
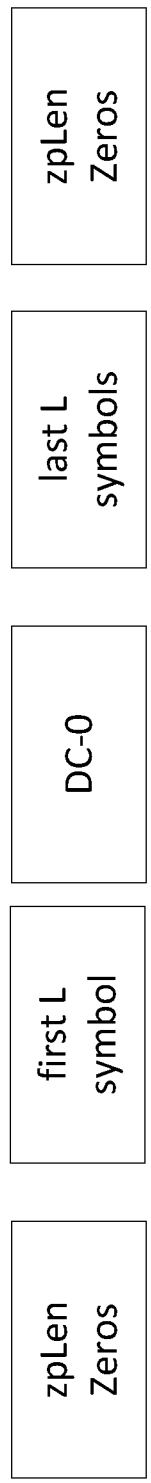
FIG. 16 shows an example SS sequence.

If no repetition is performed, the length L=(zcSegLen−1)/2 may be computed. The first length L (1:L) symbols may be symbols of selected sequence and/or may be mapped to the L subcarriers (e.g., at a side of a DC subcarrier). The last length L symbols (L+2: zcSegLen) may be symbols of selected sequence and/or may be mapped to L subcarriers (e.g., at a side (e.g., another side) of DC subcarrier). Zero for DC and/or zero padding on one or more (e.g., two) sides may be inserted, for example, to construct a sequence (e.g., the final sequence). An example of inserting zero for DC and/or zero padding on one or more (e.g., two) sides to construct the final sequence may be shown in FIG. 16.

Figure 17:
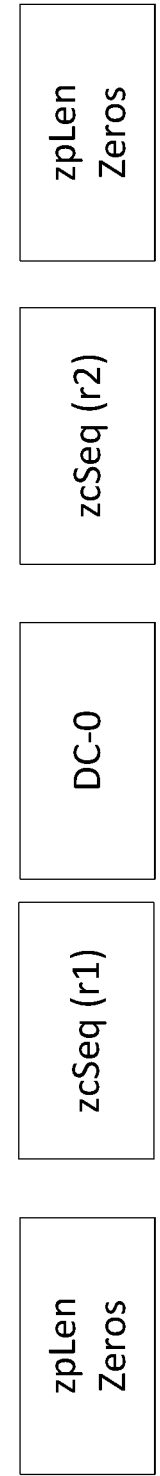
FIG. 17 shows another example SS sequence.

A sequence (e.g., the same sequence) may be used on one or more (e.g., either) side of a DC subcarrier. For example, if repetition of one or more sequences (e.g., two sequences) is performed, a sequence (e.g., the same sequence) may be used on one or more (e.g., either) side of a DC subcarrier. An example of using a sequence (e.g., the same sequence) on one or more (e.g., either) side of a DC subcarrier may be shown in FIG. 17.

Figure 18:
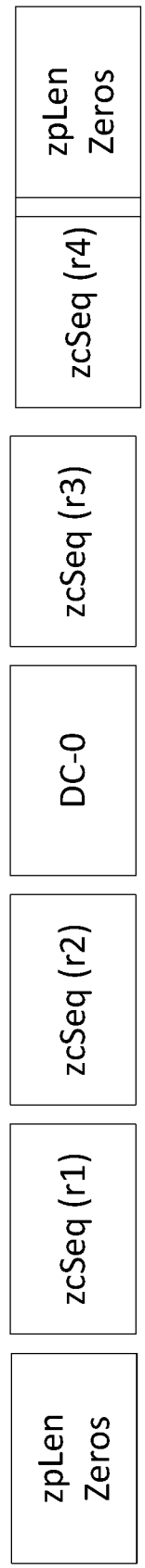
FIG. 18 shows another example SS sequence.

If four repetitions are performed, a sequence (e.g., the same sequence) may be used twice on each side of DC subcarrier. An example of using a sequence (e.g., the same sequence) twice on each side of DC subcarrier is shown in FIG. 18.

Figure 19:
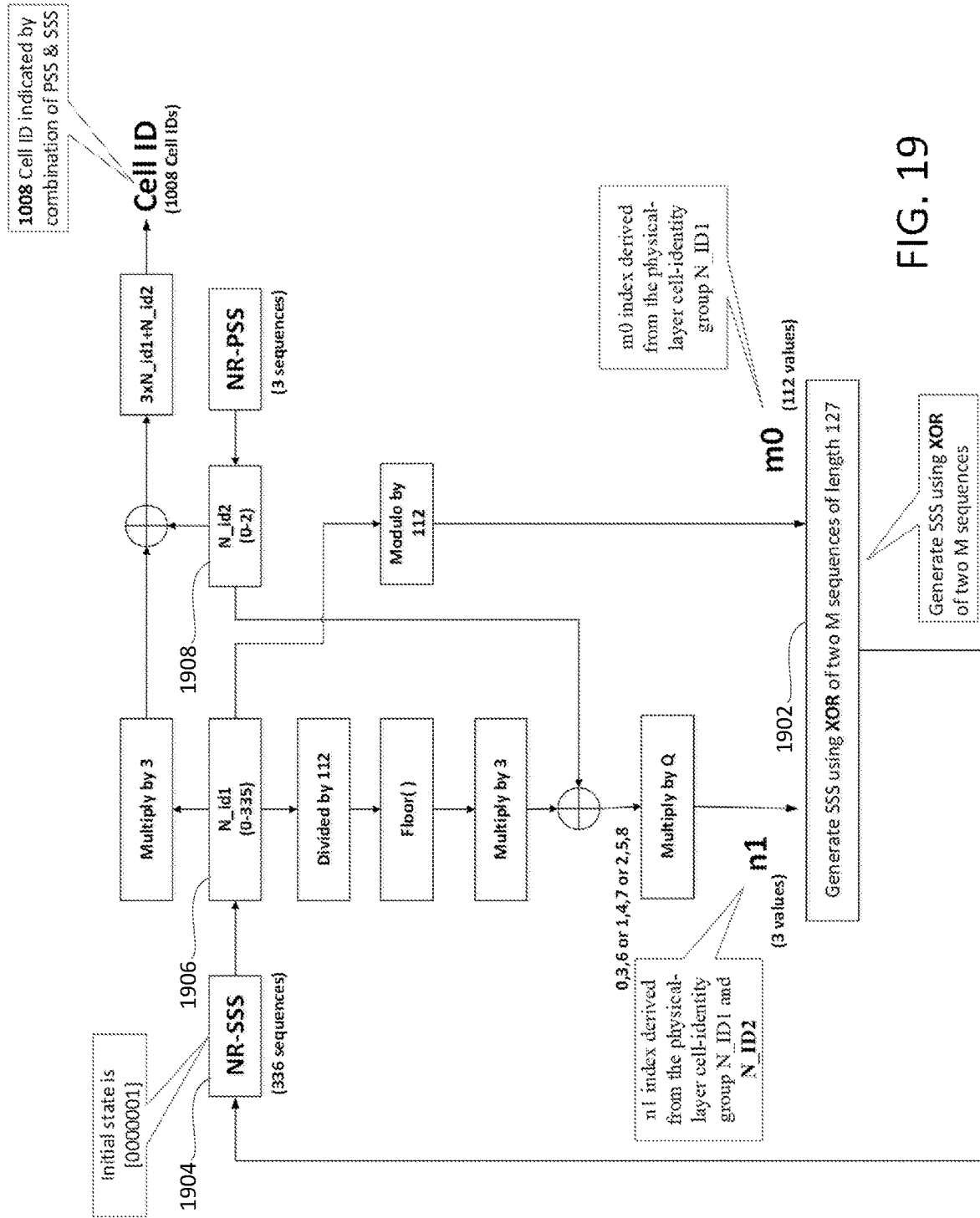
FIG. 19 shows an example new radio (NR)-Secondary Synchronization Signal (SSS) Sequence Design.

An example new radio (NR)-Secondary Synchronization Signal (SSS) design is depicted in FIG. 19.

An SSS sequence may be generated, at 1902. The SSS sequence may be an NR-SSS 1904. The SSS sequence may be generated using one or more M sequences. For example, the SSS may be generated using an XOR of two M sequences. One or more of the following may apply. Polynomials may be defined for m-sequences. For example, two generator polynomials may be defined for m-sequences. A cyclic shift (e.g., a circular shift) may be applied to an m-sequence. For example, a cyclic shift (e.g., a circular shift) may be applied to an m-sequence according to a cell ID (e.g., an NR-cell ID). An SSS (e.g., an NR-SSS) sequence may be generated using a polynomial with N1 cyclic shifts (e.g., circular shifts) and/or a polynomial with N2 cyclic shifts (e.g., circular shifts). For example, N1 may equal 127 and/or N2 may equal 9. Example polynomials for the two polynomials may be $f0(x)=x^7+x^4+1$ and/or $f1(x)=x^7+x+1$. Polynomials for the two polynomials may be used for alternatives and/or optimization. An initial state (e.g., an initial state of an SSS, such as an NR-SSS) may be 0000001. Two (e.g., two different) M sequences (e.g., M sequences of the same length) may be generated with two (e.g., two different) polynomials (e.g., polynomials of the same order). 1000 (e.g., approximately 1000) cell IDs may be indicated and/or used. The cell-IDS (e.g., the indicated and/or used cell-IDs) may be referred to as nCellMax. The cell-IDs may be indicated and/or used in one or more (e.g., different) ways.

For two (e.g., two different) M sequences (e.g., M sequences of the same length) generated with two (e.g., two different) polynomials (e.g., polynomials of same order), one or more of the following may apply.

M sequences (e.g., different M sequences) may be constructed from polynomials (e.g., irreducible primitive polynomials). For example, M sequences (e.g., different M sequences) may be constructed from polynomials (e.g., irreducible primitive polynomials) for a predefined order (e.g., degree). For example, for an order 7 there may be 18 (e.g., 18 different) polynomials available. The polynomials may be represented by octal values. For example, the polynomials may be represented by the following octal values: 203, 211, 217,221, 235, 247, 253, 271, 277, 301, 313, 323, 325, 345, 357, 361,367, 375.

One or more combinations of polynomials (e.g., two polynomials) from a set (e.g., a set of polynomials) may be used. One or more polynomials (e.g., irreducible primitive polynomials) may be used. For example, a combination of pairs (e.g., preferred pairs) of polynomials (e.g., irreducible primitive polynomials) may be used. The combination of pairs (e.g., preferred pairs) of polynomials (e.g., irreducible primitive polynomials) may result in a gold code.

The M sequences may be of length 127 and/or the polynomial may be of an order 7 (e.g., 217 and 211, which may be a pair, such as a preferred pair, to generate a gold code):

Octal 217 may be Binary 10001111, which may translate to:

$x(\bar{i}+7)=(x(\bar{i}+3)+x(\bar{i}+2)+x(\bar{i}+1)+x(\bar{i}))\mod 2$, $0 \leq \bar{i} \leq 119$ $s1=1-2x$ Octal 211 may be Binary 10001001, which may translate to:

$x(\bar{i}+7)=(x(\bar{i}+3)+x(\bar{i}))\mod 2$, $0<\bar{i}<119$ $s2=1-2x$

Initialization for both $x(0)=0, x(1)=0, x(2)=0, x(3)=0, x(4)=0, x(5)=0, x(6)=1$.

Possible combinations may be [221, 203]. The combinations may correspond to the polynomials $f0(x)=x^7+x^4+1$ and $f1(x)=x^7+x+1$, respectively.

1000 (e.g., approximately 1000) cell IDs may be indicated (e.g., determined). The indicated cell-IDs may be referred to as nCellMax. The cell-IDs may be indicated in one or more (e.g., one or more different) ways. One or more of the following may apply.

The cell-IDs may be indicated (e.g., determined) by an SSS (e.g., an SSS only). One or more cyclic shift (e.g., circular shift) parameters may equal a function (Cell-ID). For example, [m0, n1] may equal a function (Cell-ID). A cyclic shift (e.g., circular shift) parameter (e.g., m0) may be set to one or more (e.g., different) values. As shown in FIG. 19, the one or more cyclic shift parameters (e.g., values of the cyclic shift parameters) may be determined from one or more sets of cyclic shifts (e.g., sets of circular shifts). For example, a cyclic shift parameter (e.g., m0) may be determined (e.g., set) from a set of cyclic shifts (e.g., 0 to p−1). The set of cyclic shifts for m0 may comprise 112 values, as shown in FIG. 19. s1 may be cycle shifted (e.g., circular shifted) by m0. For example, $s_1^{(m0)}(n)=\tilde{s}_1((n+m0)\mod 127)$. As shown in FIG. 19, another cyclic shift parameter (e.g., n1) may be set to one or more (e.g., different) values. The one or more values may be a set of cyclic shifts. The set of cyclic shifts for n1 may comprise 3 values, as shown on FIG. 19. The cyclic shift (e.g., n1) may be determined from a set of cyclic shifts, for example, that may differ from the set of cyclic shifts in which the cyclic shift (e.g., m0) is set. For example, n1 may be set to values (e.g., some or all values) from 0 to ceil(nCellMax/p), 0 to floor(nCellMax/p), or other values. s2 may be circular shifted by n1. For example, $s_2^{(n1)}(n)=\tilde{s}_2((n+n1)\mod 127)$.

m0 may be set to some or all values from 0-126 (e.g., 127 cyclic shifts) and/or n1 may be set to some or all values from 0:8 (e.g., 9 cyclic shifts). For example, an SSS (e.g., an NR-SSS) sequence may be generated using a polynomial with 127 cyclic shifts and/or a polynomial with 9 cyclic shifts. m0 may be set to 0-32 and/or n1 may be set to 0:32. m0 and/or n1 may be set to one or more combinations, for example, which may be predefined and/or known to the receiver.

The cell-IDs may be determined (e.g., indicated) based on one or more combinations of PSS and/or SSS. For example, the cell-IDs may be determined (e.g., indicated) based on one or more cell-IDs carried by one or more combinations of PSS and/or SSS. [m0, m1, NID2] may be equal to the function (Cell-ID). One or more (e.g., three) NID2s may be indicated by PSS. The NID2s may be cell IDs carried by the PSS (e.g., the NR-PSS). For example, one or more (e.g., three) cell IDs may be carried by the PSS. ceil(nCellMax./3) may be set using m0 and m1 shifts of s1 and s2. If nCellMax=1008, ceil(nCellMax./3) may equal 336. The range for NID1 may be [0,335], as shown at 1906. NID1 may be the cell IDs carried by the SSS (e.g., the NR-SSS).

A cyclic shift parameter (e.g., m0) may be set to one or more values. For example, m0 may be set to 0 to p−1 with offset or without offset. The offset may be fixed or the offset may be a function of m1 and NID2, described herein. s1 may be circular shifted by m0. For example, $s_1^{(m0)}(n)=\tilde{s}_1((n+m0)\mod 127)$. m1 may be set to one or more values. For example, m1 may be set to values from 0 to ceil(nCellMax/(3*p))−1, 0 to floor(nCellMax/(3*p)), or other values. s2 may be circular shifted by n1. n1 may be equal to m1, a function of m1, or a function of m1 and one or more other parameters. For example, n1=function (m1, NID2). For example, $$s_2^{(m1)}(n)=\tilde{s}_2((n+n1)\mod 127)$$

$$n1=f(m1, NID2)$$

eg: $n1=m1*3+NID2$ m0=0 to 111 may be used. p may equal 112. For example, p may equal 112 for even distribution of 0-335. m1 may equal 0,1,2. NID2 may equal 0,1,2, as shown at 1908. In the case of offset, m0=m0+offset, where offset may be n1+1. 112 shifts (e.g., different shifts) may be used for a first sequence and/or 9 shifts (e.g., different shifts) may be used for a second sequence (e.g., assuming 1008 cell-IDs).

m0 may be set from 0 to 126 (e.g., p=127); m1 may be set to 0,1,2; and/or NID2 may be set to 0,1,2. In the case of an offset, m0 may equal m0+offset. The offset may be n1+1. [127, 127,82] shift may be used for a first sequence, for example, corresponding to different shifts (e.g., three different shifts) for a second sequence.

NID2 may be set to 0,1,2, as shown at 1912. m0 may be set to 0 to 32; and/or m1 may be set to 0 to 11. In the case of an offset, m0=m0+offset, where offset may be n1+1.32 shifts may be used for a first sequence and 12 shifts (e.g., different shifts) may be used for a second sequence (given 1056 cell-IDs). For example, 1056 cell-IDs may be indicated using SSS (e.g., SSS alone). 12 shifts in a sequence and 36 shifts in a sequence may indicate 1056 cell IDs (e.g., 1056 unique cell IDs in total).

As provided herein, n1 may be equal to m1, a function of m1, or a function of m1 and one or more other parameters. The cyclic shift (e.g., circular shift) values n1 and m0 may be determined (e.g., jointly determined) by the cell IDs carried by NR-PSS (e.g., NID2=0, 1, 2) and/or the cell IDs carried by NR-SSS (e.g., NID1=0, 1, . . . , 335). For example, as shown in FIG. 19, one or more of the cyclic shift values may be determined by the decorrelation of the SSS sequences. The cell ID may be given by $N_{ID}^{cell}=3NID1+NID2$;

$$n1 = Q\left(3\left\lfloor\frac{NID1}{112}\right\rfloor + NID2\right)$$

where Q may be a scaling factor. The value of Q may be equal to one or the value of Q may be greater than one, for example, Q=1 or Q=5; and/or m0=(NID1 mod 112)+offset. Offset may be zero. For example, no value for offset may be used. Offset may be a non-zero value. For example, offset may be a fixed value or may depend on one or more parameters (e.g., offset may be n1+1).

NID2, m0, and/or m1 may be set to one or more combinations which, for example, may be predefined and/or known to the receiver.

One or more features (e.g., functions) for n1 and/or m0 may be used.

Figures 20, 21:
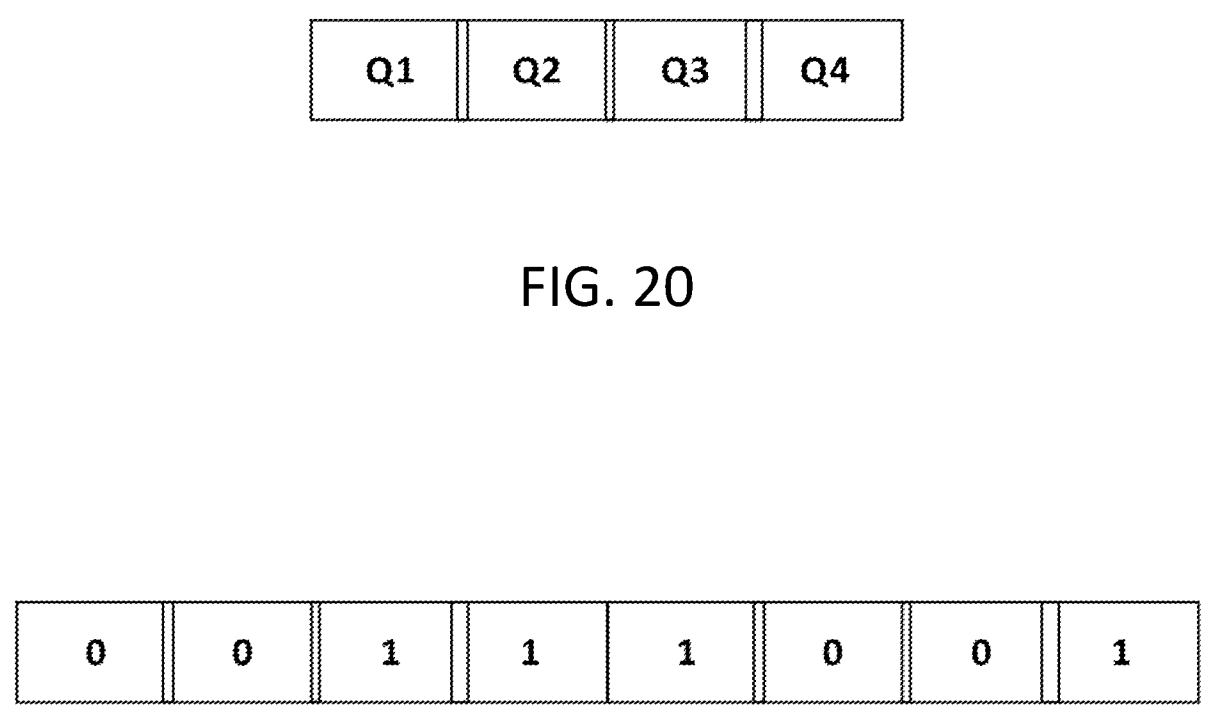

A quasi-co-located (QCL, or QCL-ed) Indication for synchronization signal (SS) Blocks may be used. An example quasi-co-located (QCL) indication for SS blocks is shown in FIG. 20.

The WTRU may determine (e.g., assume) that SS blocks with an SS block index or time index (e.g., the same SS block index or time index) may be QCL-ed. For example, the WTRU may determine (e.g., assume) that the SS block of the same SS block index or time index across an SS burst set may be QCL-ed. The gNB may indicate (e.g., indicate to the WTRU) when the determination (e.g., assumption) may not hold. For example, the gNB may include a flag to indicate (e.g., indicate to the WTRU) that SS blocks having the same SS block index or time index may not be QCL-ed. The flag may be included in a PBCH payload, remaining minimum system information (RMSI), and/or other system information (OSI). A flag may indicate SS blocks (e.g., all SS blocks) of the same SS block index or time index that may not be QCL-ed. One or more flags may be used. For example, one or more flags may be used where a (e.g., each) flag for an (e.g., each) SS block and/or SS block group may be used to indicate the individual SS block of the SS block (e.g., same SS block) index or time index that may be QCL-ed. One or more flags may be used for an SS block group, for example, to indicate that the individual SS block in group may be QCL-ed.

The WTRU may not determine (e.g., assume) that SS blocks with different SS block indices or time indices are QCL-ed. The gNB may indicate to the WTRU, for example, if SS blocks with different SS block indices may be QCL-ed. The gNB may use one or more of the following ways to indicate QCL for SS blocks with different SS block indices or time indices. For example, the gNB may use a repetition factor (e.g., a single repetition factor); multiple repetition factors; and/or a toggle bitmap.

The gNB may use a repetition factor Q, for example, to indicate QCL for SS blocks. The WTRU may determine (e.g., assume) that Q SS blocks are QCL-ed, for example, when the WTRU receives the indication. Q SS blocks may be consecutive and/or based on one or more predefined patterns. Q SS blocks may be configured.

The gNB may use one or more repetition factors. For example, the gNB may use repetition factors Q1, Q2, etc. The gNB may use repetition factors to indicate a QCL for SS blocks. The WTRU may assume that Q1 SS blocks, Q2 SS blocks, etc., may be QCL-ed when the WTRU receives the indication. Q1, Q2, . . . SS blocks may be consecutive and/or based on one or more predefined patterns. Q1, Q2, . . . SS blocks may be configured. For example, the WTRU may assume that SS blocks with index #0 to Q1-1 may be QCL-ed. The WTRU may assume that SS blocks with index # Q1 to Q1+Q2-1 may be QCL-ed.

A gNB may use toggle bitmaps, for example, to indicate a QCL for SS blocks. The WTRU may determine (e.g., assume) that SS blocks with a bit value (e.g., the same bit value) may be QCL-ed. For example, the WTRU may determine (e.g., assume) that SS blocks with the same bit value may be QCL-ed when the WTRU receives the QCL indication. The WTRU may determine (e.g., assume) that SS blocks with index #0 and 1 may be QCL-ed. The WTRU may determine (e.g., assume) that SS blocks with index #2, 3 and 4 may be QCL-ed, The WTRU may determine (e.g., assume) that SS blocks with index #5 and 6 may be QCL-ed. An example QCL indication for SS Blocks is shown in FIG. 21.

QCL may be associated with spatial, average gain, delay, and/or Doppler parameters.

QCL indications may be used for maximum SS blocks, SS block candidates, SS block nominal positions, and/or transmitted (e.g., actually transmitted) SS blocks.

A rate matching indication may be used.

For transmitted (e.g., actually transmitted) SS blocks, a rate matching indication using a bitmap may be utilized. For example, a rate matching indication using a bitmap may be utilized to enable the WTRU to perform rate matching for PDSCH and/or PDCCH reception and/or detection. The rate matching indication may be WTRU-specific. The indicated transmitted (e.g., actually transmitted) SS blocks may be WTRU-specific. For example, a rate matching indication conveying a full set, or a subset, of transmitted (e.g., actually transmitted) SS blocks may be indicated to a WTRU for performing rate matching for PDSCH and/or PDCCH reception. A rate matching indication conveying a full set, or subset, of transmitted (e.g., actually transmitted) SS blocks may be indicated to a WTRU for performing rate matching for PDSCH and/or PDCCH reception. Another rate matching indication conveying another full set, or subset, of transmitted (e.g., actually transmitted) SS blocks may be indicated to another WTRU for performing rate matching for PDSCH and/or PDCCH reception. The rate matching indication may be carried in a WTRU-specific signaling. For example, the rate matching indication may be carried in RRC signaling. The rate matching indication may be carried in a WTRU-specific L1/2 control channel, such as down control information (DCI), NR-PDCCH, MAC, and/or MAC control element (CE) signaling. For example, to handle the dynamic nature of rate matching (e.g., due to SS blocks, beams, and PDSCH or PDCCH), the rate matching indication may be carried in a WTRU-specific L1/2 control channel, such as down control information (DCI), NR-PDCCH, MAC, and/or MAC control element (CE) signaling.

A rate mating indication (e.g., a two-stage rate matching indication) may be used. For example, a rate matching may use a first stage and/or a second stage. A first stage may indicate transmitted (e.g., actually transmitted) SS blocks. A second stage may indicate SS blocks for rate matching.

Rate matching may be performed using transmitted (e.g., actually transmitted) SS blocks. For example, rate matching may be performed using one or more (e.g., all) actually transmitted SS blocks. A coarse rate matching may be performed for one or more (e.g., all) WTRUs. For example, the first stage may be a coarse rate matching for one or more (e.g., all) WTRUs. Rate matching may be enhanced using WTRU-specific SS blocks that may impact the rate matching for a WTRU. If a subset (e.g., only a subset) of transmitted (e.g., actually transmitted) SS blocks is required for rate matching for a WTRU, the indication may include (e.g., may only include) the subset of transmitted (e.g., actually transmitted) SS blocks. The indication may include (e.g., only include) the subset of transmitted (e.g., actually transmitted) SS blocks and may not include a set (e.g., full set) of transmitted (e.g., actually transmitted) SS blocks. For example, the indication may include (e.g., only include) the subset of actually transmitted SS blocks and may not include a set (e.g., full set) of actually transmitted SS blocks in a second stage. The second stage may be a fine rate matching for a WTRU. Rate matching may be performed using one stage. For example, rate matching may be performed using only stage 1 or only stage 2. Rate matching may be performed using two stages. For example, rate matching may be performed using a combination of stage 1 and stage 2.

Resources (e.g., indicated resources) may be reserved for a full set or a subset of transmitted (e.g., actually transmitted) SS blocks. For example, indicated resources (e.g., time and/or frequency resources) may be reserved for a full set or subset of transmitted (e.g., actually transmitted) SS blocks. Data channels (e.g., PDSCH) and/or control channels (e.g., PDCCH) may be rate matched. For example, data channels (e.g., PDSCH) and/or control channels (e.g., PDCCH) may be rate matched around the indicated transmitted (e.g., actually transmitted) SS blocks. Data channels (e.g., PDSCH) and/or control channels (e.g., PDCCH) may be rate matched for a full set or a subset of transmitted (e.g., actually transmitted) SS blocks.

Actually transmitted SS blocks (e.g., a full set or a subset) may be indicated using one or more of the following. For example, transmitted (e.g., actually transmitted) SS blocks (e.g., a full set or a subset) may be indicated using a group-bitmap. A group or SS/PBCH group may be consecutive SS/PBCH blocks. A group-bitmap may indicate which group or SS/PBCH group may be transmitted (e.g., actually transmitted). For example, one or more (e.g., all) SS/PBCH blocks within an indicated transmitted group or SS/PBCH group may be transmitted (e.g., actually transmitted).

Transmitted (e.g., actually transmitted) SS blocks (e.g., a full set or a subset) may be indicated using a group-bitmap, for example, with a bitmap in the group. A group or SS/PBCH group may be defined as consecutive SS blocks or SS/PBCH blocks. A bitmap in the group or SS/PBCH group may indicate which SS/PBCH block is transmitted (e.g., actually transmitted). For example, a bitmap in the group or SS/PBCH group may indicate which SS/PBCH block is transmitted (e.g., actually transmitted) within a group or SS/PBCH group. A (e.g., each) group or SS/PBCH group may have a pattern (e.g., the same, or different, pattern) of an SS/PBCH block transmission. A group-bitmap may indicate which group or SS/PBCH group is transmitted (e.g., actually transmitted).

Transmitted (e.g., actually transmitted) SS blocks (e.g., a full set or a subset) may be indicated using a group-bitmap with the number of transmitted (e.g., actually transmitted) SS/PBCH blocks in the group. The transmitted (e.g., actually transmitted) SS/PBCH blocks may have a starting index (e.g., a fixed, or non-fixed, starting index) of the SS/PBCH blocks in the group or SS/PBCH group. A group or SS/PBCH group may be defined as consecutive SS/PBCH blocks. A group-bitmap may be used to indicate which group or SS/PBCH group is transmitted (e.g., actually transmitted). SS/PBCH blocks within a group may be consecutive (e.g., logically consecutive). The number of transmitted (e.g., actually transmitted) SS/PBCH blocks may indicate the number of consecutive (e.g., logically consecutive) SS/PBCH blocks that are actually transmitted. For example, the number of transmitted (e.g., actually transmitted) SS/PBCH blocks may indicate the number of consecutive (e.g., logically consecutive) SS/PBCH blocks that are transmitted (e.g., actually transmitted), starting from the first index. The first index may be a fixed starting index. The first index may not be a fixed starting index. If the first index is a fixed starting index, an indication (e.g., an additional indication) may not be required. If the first index is not a fixed starting index, an indication (e.g., an additional indication) may be required. For example, an additional indication may be required to indicate the index (e.g., the first index or starting index) of the transmitted (e.g., actually transmitted) SS/PBCH block. The number of transmitted (e.g., actually transmitted) SS/PBCH blocks in the group may be equally (e.g., commonly) applied to one or more (e.g., all) transmitted groups or SS/PBCH groups. The number of transmitted (e.g., actually transmitted) SS/PBCH blocks in the group may not be equally (e.g., commonly) applied to one or more (e.g., all) transmitted groups or SS/PBCH groups.

Transmitted (e.g., actually transmitted) SS blocks (e.g., a full set or a subset) may be indicated using a bitmap in a group with the number of actually transmitted groups or SS/PBCH groups. The transmitted (e.g., actually transmitted) groups or SS/PBCH groups may have a fixed starting index of a group or a non-fixed starting index of a group. A group or SS/PBCH group may be defined as consecutive SS/PBCH blocks. A bitmap in a group or SS/PBCH group may indicate which SS/PBCH block is transmitted (e.g., actually transmitted) within a group or SS/PBCH group. A (e.g., each) group or SS/PBCH group may have the same pattern of an SS/PBCH block transmission. A (e.g., each) group or SS/PBCH group may have a different pattern of an SS/PBCH block transmission. A bitmap in the group may or may not be equally (e.g., commonly) applied to one or more (e.g., all) transmitted groups or SS/PBCH groups. The number of transmitted (e.g., actually transmitted) groups or SS/PBCH groups may indicate the number of consecutive groups or SS/PBCH groups that may be transmitted (e.g., actually transmitted). For example, the number of transmitted (e.g., actually transmitted) groups or SS/PBCH groups may indicate the number of consecutive groups or SS/PBCH groups that may be transmitted (e.g., actually transmitted), starting from the first group or fixed starting index of the group. If the starting index of the group or the first group is not fixed, an indication may be used to indicate the starting index of the group or the first group for SS/PBCH groups.

Transmitted (e.g., actually transmitted) SS blocks (e.g., a full set or a subset) may be indicated using the number of transmitted (e.g., actually transmitted) SS/PBCH blocks with the starting index of transmitted (e.g., actually transmitted) SS/PBCH blocks and/or the space (e.g., gap) between one or more (e.g., two) consecutive SS/PBCH blocks. A space (e.g., gap) may be fixed. The number of transmitted (e.g., actually transmitted) SS/PBCH blocks and/or the starting index of transmitted (e.g., actually transmitted) SS/PBCH blocks may be indicated. A space (e.g., gap) may be indicated.

The transmitted (e.g., actually transmitted) SS blocks may be indicated in remaining minimum system information (RMSI) for higher and/or lower frequencies. The transmitted (e.g., actually transmitted) SS blocks may be indicated in RRC signaling and/or L1/2 control signaling. The transmitted (e.g., actually transmitted) SS blocks may be indicated in RRC signaling and/or L1/2 control signaling for higher and/or lower frequencies.

Although the features and elements described herein consider LTE, LTE-A, New Radio (NR), and/or 5G specific protocols, it should be understood that the features and elements described herein are not restricted to LTE, LTE-A, New Radio (NR), and/or 5G specific protocols and may also be applicable to other wireless systems.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
a processor configured to:
receive a synchronization signal (SS) block of a plurality of SS blocks comprised in a SS burst set, each of the plurality of SS blocks comprised in the SS burst set comprising a primary synchronization signal (PSS), a secondary synchronization signal (SSS), and a physical broadcast channel (PBCH) transmission, wherein each respective SS block of the plurality of SS blocks comprised in the SS burst set is associated with a respective SS-block index that identifies the respective SS block within the SS burst set;
determine a first identifier (ID) associated with the PSS of the SS block comprised in the SS burst set;
determine a secondary synchronization signal sequence based on the SSS received in the SS block comprised in the SS burst set, wherein the secondary synchronization signal sequence is associated with a first sequence with a first cyclic shift and a second sequence with a second cyclic shift, and wherein the first cyclic shift uses the first ID determined based on the PSS and a second ID, and the second cyclic shift uses the second ID;
determine the second ID using at least the SSS and the first ID;
determine a physical cell ID (PCI) using the first ID and the second ID; and
determine a SS-block index for the received SS block comprising the PSS, the SSS, and the PBCH of the plurality of SS blocks comprised in the SS burst set based on the PBCH transmission comprised in the received SS block, wherein a scrambling sequence of the PBCH transmission is based on the determined PCI and the SS-block index.

2. The WTRU of claim 1, wherein the first ID is NID2.

3. The WTRU of claim 1, wherein the processor being configured to determine the second ID comprises the processor being configured to determine the second ID using the first cyclic shift, the second cyclic shift, and the first ID.

4. The WTRU of claim 1, wherein the processor is further configured to:
receive an indication of a subset of the plurality of SS blocks; and
use the indication to perform rate matching for a physical downlink shared channel (PDSCH) or a physical downlink control channel (PDCCH).

5. The WTRU of claim 1, wherein the SSS is generated using a first polynomial and a second polynomial, wherein the first polynomial is generated with 112 cyclic shifts and the second polynomial is generated using 3 cyclic shifts.

6. The WTRU of claim 1, wherein the second ID is NID1.

7. A method, comprising:
receiving a synchronization signal (SS) block of a plurality of SS blocks comprised in a SS burst set, each of the plurality of SS blocks comprised in the SS burst set comprising a primary synchronization signal (PSS), a secondary synchronization signal (SSS), and a physical broadcast channel (PBCH) transmission, wherein each respective SS block of the plurality of SS blocks comprised in the SS burst set is associated with a respective SS-block index that identifies the respective SS block within the SS burst set;
determining a first identifier (ID) associated with the PSS of the SS block comprised in the SS burst set;
determining a secondary synchronization signal sequence based on the SSS received in the SS block comprised in the SS burst set, wherein the secondary synchronization signal sequence is associated with a first sequence with a first cyclic shift and a second sequence with a second cyclic shift, and wherein the first cyclic shift uses the first ID determined based on the PSS and a second ID, and the second cyclic shift uses the second ID;
determining the second ID using at least the SSS and the first ID;
determining a physical cell ID (PCI) a third ID using the first ID and the second ID; and
determining a SS-block index for the received SS block comprising the PSS, the SSS, and the PBCH of the plurality of SS blocks comprised in the SS burst set based on the PBCH transmission comprised in the received SS block, wherein a scrambling sequence of the PBCH transmission is based on the determined PCI and the SS-block index.

8. The method of claim 7, wherein the first ID is NID2.

9. The method of claim 7, wherein determining the second ID comprises determining the second ID using the first cyclic shift, the second cyclic shift, and the first ID.

10. The method of claim 7, wherein the method further comprises:
receiving an indication of a subset of the plurality of SS blocks; and
using the indication to perform rate matching for a physical downlink shared channel (PDSCH) or a physical downlink control channel (PDCCH).

11. The method of claim 7, wherein the SSS is generated using a first polynomial and a second polynomial, wherein the first polynomial is generated with 112 cyclic shifts and the second polynomial is generated using 3 cyclic shifts.

12. The method of claim 7, wherein the second ID is NID1.

* * * * *

UNITED STATES PATENT AND TRADEMARK OFFICE
CERTIFICATE OF CORRECTION

| | |
|---|---|
| PATENT NO. | : 12,136,995 B2 |
| APPLICATION NO. | : 16/481166 |
| DATED | : November 5, 2024 |
| INVENTOR(S) | : Kyle Jung-Lin Pan et al. |

Page 1 of 1

It is certified that error appears in the above-identified patent and that said Letters Patent is hereby corrected as shown below:

In the Claims

In Claim 7: Column 34, Line 29, delete "a third ID".

Signed and Sealed this
Eleventh Day of February, 2025

Coke Morgan Stewart
*Acting Director of the United States Patent and Trademark Office*